(12) United States Patent
Yakabe

(10) Patent No.: US 10,620,352 B2
(45) Date of Patent: Apr. 14, 2020

(54) CIRCULARLY POLARIZED LIGHT SEPARATING FILM AND METHOD FOR PRODUCING SAME

(71) Applicant: ZEON CORPORATION, Chiyoda-ku, Tokyo (JP)

(72) Inventor: Hiroshi Yakabe, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/574,489

(22) PCT Filed: May 27, 2016

(86) PCT No.: PCT/JP2016/065823
§ 371 (c)(1),
(2) Date: Nov. 16, 2017

(87) PCT Pub. No.: WO2016/190435
PCT Pub. Date: Dec. 1, 2016

(65) Prior Publication Data
US 2018/0143361 A1   May 24, 2018

(30) Foreign Application Priority Data
May 28, 2015   (JP) .................................. 2015-108212

(51) Int. Cl.
*G02B 5/30*   (2006.01)
*C08G 73/02*   (2006.01)
(Continued)

(52) U.S. Cl.
CPC ........... *G02B 5/3016* (2013.01); *C08G 73/02* (2013.01); *C08G 73/18* (2013.01);
(Continued)

(58) Field of Classification Search
CPC ...... G02B 5/3016; G02B 5/30; G02B 5/3033; G02B 5/3041; G02B 5/305; G02B 1/08;
(Continued)

(56) References Cited

U.S. PATENT DOCUMENTS 2,367,661 A   1/1945 Agre
2,367,670 A   1/1945 Christ
(Continued)

FOREIGN PATENT DOCUMENTS

CN   104603165 A   5/2015
EP   2871192 A1   5/2015
(Continued)

OTHER PUBLICATIONS

Aug. 30, 2016, International Search Report issued in the International Patent Application No. PCT/JP2016/065823.
(Continued)

*Primary Examiner* — Ruiyun Zhang
(74) *Attorney, Agent, or Firm* — Kenja IP Law PC

(57) ABSTRACT

A circularly polarized light separating film including a resin layer containing a polymer of a polymerizable liquid crystal compound, wherein the polymerizable liquid crystal compound contains a main-chain mesogen and a side-chain mesogen bonded to the main-chain mesogen in a molecule of the polymerizable liquid crystal compound, and the polymer has cholesteric regularity.

9 Claims, 1 Drawing Sheet

(51) Int. Cl.
*C08G 73/18* (2006.01)
*C09K 19/38* (2006.01)
*G02B 1/08* (2006.01)

(52) U.S. Cl.
CPC ...... *C09K 19/3809* (2013.01); *C09K 19/3838* (2013.01); *G02B 1/08* (2013.01); *G02B 5/30* (2013.01); *Y10T 428/10* (2015.01); *Y10T 428/1036* (2015.01)

(58) Field of Classification Search
CPC . Y10T 428/10; Y10T 428/1036; B05D 3/067; B05D 5/06; C08G 73/18; G02F 1/133528; G02F 1/1337; G02F 1/13363; G02F 1/133633; G02F 2001/133638
USPC .................. 428/1.1, 1.3, 1.33; 349/117–119; 359/489.07; 264/1.7
See application file for complete search history.

(56) References Cited

U.S. PATENT DOCUMENTS

| | | | |
|---|---|---|---|
| 2,448,828 | A | 9/1948 | Renfrew |
| 2,722,512 | A | 11/1955 | Crandall |
| 2,951,758 | A | 9/1960 | Notley |
| 3,046,127 | A | 7/1962 | Livingston et al. |
| 3,549,367 | A | 12/1970 | Chang et al. |
| 4,212,970 | A | 7/1980 | Iwasaki |
| 4,239,850 | A | 12/1980 | Ikeda et al. |
| 4,619,998 | A | 10/1986 | Buhr |
| 4,696,888 | A | 9/1987 | Buhr |
| 6,217,792 | B1 | 4/2001 | Parri |
| 6,468,444 | B1 | 10/2002 | Meyer et al. |
| 2003/0137632 | A1 | 7/2003 | Kawabata |
| 2010/0272924 | A1 | 10/2010 | Tanabe |
| 2010/0285008 | A1 | 11/2010 | Kelley |
| 2010/0297113 | A1 | 11/2010 | Kelley et al. |
| 2011/0147657 | A1 | 6/2011 | Hirai et al. |
| 2015/0175564 | A1 | 6/2015 | Sakamoto et al. |
| 2015/0265564 | A1 | 9/2015 | Kelley |
| 2016/0280672 | A1 | 9/2016 | Sakamoto et al. |
| 2019/0062289 | A1 | 2/2019 | Sakamoto et al. |

FOREIGN PATENT DOCUMENTS

| | | | |
|---|---|---|---|
| JP | S60105667 | A | 6/1985 |
| JP | 2003066214 | A | 3/2003 |
| JP | 2003131213 | A | 5/2003 |
| JP | 2003313187 | A | 11/2003 |
| JP | 2005336103 | A | 12/2005 |
| JP | 2009300662 | A | 12/2009 |
| JP | 2010111104 | A | 5/2010 |
| JP | 2010254901 | A | 11/2010 |
| JP | 2011148762 | A | 8/2011 |
| JP | 2014174321 | A | 9/2014 |
| JP | 2014174321 | A * | 9/2014 |
| JP | 2016047813 | A | 4/2016 |
| WO | 9800428 | A1 | 1/1998 |
| WO | 2009042544 | A1 | 4/2009 |
| WO | 2014010325 | A1 | 1/2014 |
| WO | 2016031946 | A1 | 3/2016 |

OTHER PUBLICATIONS

Nov. 28, 2017, International Preliminary Report on Patentability issued in the International Patent Application No. PCT/JP2016/065823.

Vincent P. Tondiglia et al., Bandwidth broadening induced by ionic interactions in polymer stabilized cholesteric iquid crystals, Optical Materials Express, pp. 1465-1472, 2014, vol. 4, No. 7.

* cited by examiner

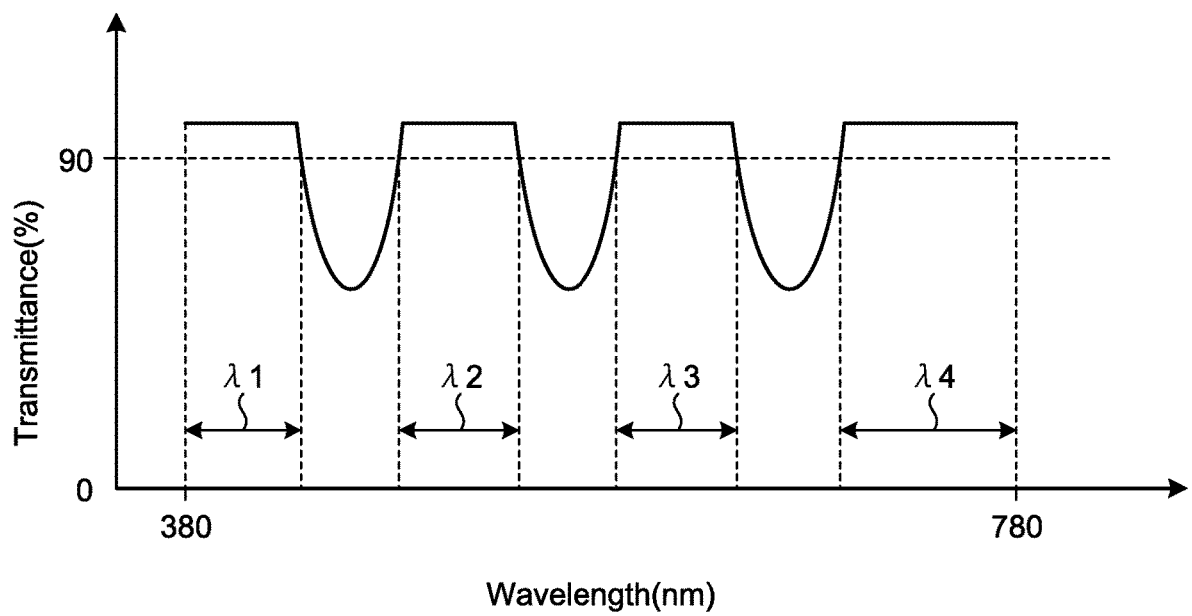

CIRCULARLY POLARIZED LIGHT SEPARATING FILM AND METHOD FOR PRODUCING SAME

FIELD

The present invention relates to a circularly polarized light separating film and a method for producing the same.

BACKGROUND

A cholesteric liquid crystal forms a helical structure in a liquid crystal state, and possesses properties to reflect circularly polarized light in a specific wavelength band corresponding to the helical structure. Taking advantage of such properties of the cholesteric liquid crystal, a circularly polarized light separating film which selectively reflects circularly polarized light in a specific wavelength band is being developed (see Patent Literature 1). For example, there can be produced a circularly polarized light separating film which can selectively reflect circularly polarized light in a specific wavelength band by polymerizing the cholesteric liquid crystal in a liquid crystal state having a desired helical structure. Such a circularly polarized light separating film usually has a structural color corresponding to the helical structure.

CITATION LIST

Patent Literature

Patent Literature 1: Japanese Patent Application Laid-Open No. 2010-254901 A

SUMMARY

Technical Problem

The aforementioned circularly polarized light separating film is sometimes required to selectively reflect circularly polarized light only in a narrow wavelength band, depending on its use. For example, when a clear structural color is desired in a circularly polarized light separating film which selectively reflects only circularly polarized light having a specific color for obtaining a desired structural color, the wavelength band in which the circularly polarized light separating film can reflect circularly polarized light may be required to be narrow.

It is conceivable that a liquid crystal compound having a small refractive index anisotropy Δn is used as a cholesteric liquid crystal in order to narrow the wavelength band in which the circularly polarized light separating film can reflect circularly polarized light. However, a prior-art liquid crystal compound having a small refractive index anisotropy Δn in general has a low phase transition temperature from a liquid crystal phase to an isotropic phase. For example, although the phase transition temperature of a prior-art liquid crystal compound having a refractive index anisotropy Δn of approximately 0.2 is usually about 150° C., the phase transition temperature of a prior-art liquid crystal compound having a refractive index anisotropy Δn of approximately 0.05 is usually as low as about 50° C. Consequently, when the temperature becomes high during the polymerization of such a liquid crystal compound having a small refractive index anisotropy Δn, the liquid crystal phase tends to be impaired. For example, when a liquid crystal compound is irradiated with light for polymerization, the liquid crystal compound absorbs the light, causing an increase in temperature. That may lead to impairment of the liquid crystal phase. When the liquid crystal phase is impaired in this manner, a desired helical structure cannot be obtained. Consequently, the function of selectively reflecting circularly polarized light is unlikely to be obtained.

The present invention has been made in view of the aforementioned problem. An object of the present invention is to provide a circularly polarized light separating film which can selectively reflect circularly polarized light in a narrow wavelength band, and a method for producing the same.

Solution to Problem

The present inventor intensively conducted studies in order to solve the aforementioned problem, and has found that a specific polymerizable liquid crystal compound has a small refractive index anisotropy Δn and a high phase transition temperature from a liquid crystal phase to an isotropic phase. Furthermore, the present inventor has found that a circularly polarized light separating film produced with this specific polymerizable liquid crystal compound can selectively reflect circularly polarized light in a narrow wavelength band. Thus, the present invention has been completed.

That is, the present invention is as follows.

(1) A circularly polarized light separating film comprising a resin layer containing a polymer of a polymerizable liquid crystal compound, wherein the polymerizable liquid crystal compound contains a main-chain mesogen and a side-chain mesogen bonded to the main-chain mesogen in a molecule of the polymerizable liquid crystal compound, and the polymer has cholesteric regularity.

(2) The circularly polarized light separating film according to (1), wherein the side-chain mesogen of the polymerizable liquid crystal compound contains an element having a high refractive index.

(3) The circularly polarized light separating film according to (1), wherein the side-chain mesogen of the polymerizable liquid crystal compound contains a benzothiazole ring.

(4) The circularly polarized light separating film according to (1), wherein the polymerizable liquid crystal compound is represented by the following Formula (I):

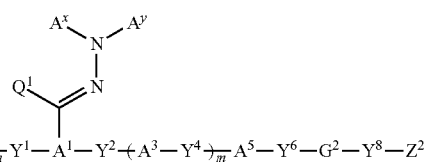

(in the Formula (I), $Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR—, —O—CR(=O)—NR—, —NR$^1$—C(=O)—O—, —NR$^1$—C(=O)—NR—, —O—NR$^1$—, or —NR$^1$—O—, wherein $R^1$ is a hydrogen atom or an alkyl group of 1 to 6 carbon atoms;

$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; provided that a case where two or more —O— or —S— groups are adjacently inserted are excluded, wherein $R^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring, wherein $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; $R^4$ is an alkyl group of 1 to 20 carbon atoms, an alkenyl group of 2 to 20 carbon atoms, a phenyl group, or a 4-methylphenyl group; $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A^x$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m and n are each independently 0 or 1).

(5) The circularly polarized light separating film according to any one of (1) to (4), wherein at least one surface of the resin layer has a concavo-convex structure.

(6) The circularly polarized light separating film according to any one of (1) to (5), wherein the resin layer has a wavelength band in which the layer is capable of reflecting circularly polarized light, and a half width of the wavelength band is 50 nm or less.

(7) The circularly polarized light separating film according to any one of (1) to (6), wherein a refractive index anisotropy Δn of the polymerizable liquid crystal compound is 0.01 or more and 0.1 or less.

(8) The circularly polarized light separating film according to any one of (1) to (7), wherein a phase transition temperature from a liquid crystal phase to an isotropic phase of the polymerizable liquid crystal compound is 100° C. or higher.

(9) The circularly polarized light separating film according to any one of (1) to (8), wherein the circularly polarized light separating film is a decorating film.

(10) A method for producing the circularly polarized light separating film according to any one of (1) to (9), the method comprising:

a step of forming, on a substrate, a layer of a liquid crystal composition containing the polymerizable liquid crystal compound, and a step of polymerizing the polymerizable liquid crystal compound contained in the layer of the liquid crystal composition.

(11) The production method according to (10), wherein the step of polymerizing the polymerizable liquid crystal compound includes:

a step of semi-curing the layer of the liquid crystal composition;

a step of forming a concavo-convex structure on a surface of the semi-cured layer of the liquid crystal composition, and a step of full-curing the layer of the liquid crystal composition.

Advantageous Effects of Invention

According to the present invention, a circularly polarized light separating film which can selectively reflect circularly polarized light in a narrow wavelength band, and a method for producing the same can be provided.

BRIEF DESCRIPTION OF DRAWINGS

FIG. 1 is a graph schematically illustrating the spectral transmittance of a sample film measured in Example 3 of the present invention.

DESCRIPTION OF EMBODIMENTS

Hereinafter, the present invention will be described in detail with reference to examples and embodiments. However, the present invention is not limited to the following examples and embodiments and may be freely modified for implementation without departing from the scope of claims of the present invention and the scope of their equivalents.

In the following description, the measurement wavelength of a refractive index anisotropy Δn is 550 nm, unless otherwise stated.

[1. Outline of Circularly Polarized Light Separating Film]

The circularly polarized light separating film according to the present invention includes a resin layer which contains a polymer of a specific polymerizable liquid crystal compound. In the following, this resin layer may be appropriately referred to as a "cholesteric resin layer". Since this cholesteric resin layer has a circularly polarized light separating function, the circularly polarized light separating film according to the present invention can exert a circularly polarized light separating function. Here, the circularly polarized light separating function of a layer means a function of, when light enters the layer, reflecting one of counter-clockwise circularly polarized light and clockwise circularly polarized light of the circularly polarized light in a specific wavelength region and allowing the transmission of light other than the reflected circularly polarized light. This wavelength region in which circularly polarized light can be reflected is referred to as a selective reflection band. Furthermore, the circularly polarized light separating film according to the present invention may include a layer other than the cholesteric resin layer.

The circularly polarized light separating film according to the present invention may have a concavo-convex structure on at least one surface of the resin layer, from the viewpoint of the improvement of reflectivity.

[2. Cholesteric Resin Layer]

<2.1. Polymerizable Liquid Crystal Compound>

In the circularly polarized light separating film according to the present invention, a polymerizable liquid crystal compound for use contains a main-chain mesogen and a side-chain mesogen bonded to the main-chain mesogen in a molecule of the polymerizable liquid crystal compound. By polymerizing such a polymerizable liquid crystal compound in a state in which the polymerizable liquid crystal compound exhibits a cholesteric phase, a cholesteric resin layer having a circularly polarized light separating function can be obtained.

As the polymerizable liquid crystal compound, a polymerizable liquid crystal compound represented by the following formula (I) is preferably used. The polymerizable liquid crystal compound represented by the formula (I) may be appropriately referred to as a "compound (I)". Since the compound (I) has liquid crystal properties, the compound (I) can exhibit a liquid crystal phase when oriented. Since this compound (I) has polymerizability, it can polymerize in a state in which the liquid crystal phase is exhibited as previously described to become a polymer while maintaining the molecular orientation in the liquid crystal phase. Therefore, by polymerizing the compound (I) in a state in which the compound (I) exhibits a cholesteric phase, a cholesteric resin layer having a circularly polarized light separating function can be obtained.

In particular, the polymerizable liquid crystal compound such as the compound (I) preferably contains an element having a high refractive index in the side-chain mesogen of the polymerizable liquid crystal compound. Here, the element having a high refractive index includes an element having a refractive index of 2.0 or more. The refractive index of the element is an atomic refractive index at sodium D lines (wavelength: 589 nm), and the values described in Handbook of Chemistry, Basic Edition, Revision, 3rd ed. (edited by The Chemical Society of Japan, Maruzen, 1984) or in J. A. Dean: Lange's Handbook of Chemistry, 15$^{th}$ ed. (McGraw-Hill 1998) may be adopted. Examples of the element having a high refractive index may include nitrogen, carbon, chlorine, bromine, iodine, and sulfur, and more preferably sulfur (S). Usually, the side-chain mesogen contains the aforementioned element as a part of or the entirety of a functional group. Examples of such a functional group may include: a nitrogen-containing functional group such as a primary aliphatic amino group (refractive index; 2.322), a secondary aliphatic amino group (refractive index: 2.499), a tertiary aliphatic amino group (refractive index: 2.840), a secondary amido group (refractive index: 2.27), a tertiary amido group (refractive index: 2.71), a hydrazone group (a group having a structure in which one hydrogen atom is removed from hydrazone, refractive index: 3.46), a hydroxylamino group (refractive index: 2.48), a hydrazine group (a group having a structure in which one hydrogen atom is removed from hydrazine, refractive index: 2.47), an aliphatic cyano group (refractive index: 3.05), an aromatic cyano group (refractive index: 3.79), and an alkyl nitrite group (refractive index: 7.59); a carbon-containing functional group such as a phenyl group (refractive index: 25.463); a chlorine-containing functional group such as a chlorine atom (refractive index: 5.967); a bromine-containing functional group such as a bromine atom (refractive index: 8.865); an iodine-containing functional group such as iodine atom (refractive index: 13.90); and a sulfur-containing functional group such as a thiocarbonyl group (refractive index: 7.97), a thiol group (refractive index: 7.69), and a —S—S— group (refractive index: 8.11). It is considered that when the polymerizable liquid crystal compound has a side-chain mesogen, and the side-chain mesogen contains an element having a high refractive index, the polymerizable liquid crystal compound can have a high phase transition temperature and a small refractive index anisotropy Δn. In particular, as the polymerizable liquid crystal compound such as the compound (I), a compound having a benzothiazole ring is particularly preferable.

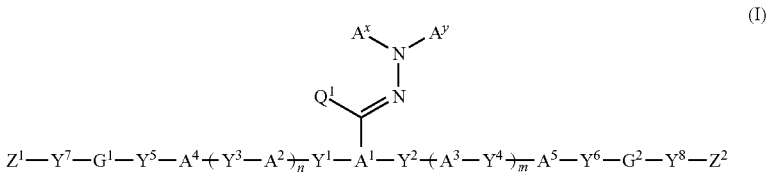

Usually in the compound (I), the group —Y$^5$-A$^4$-(Y$^3$-A$^2$)$_n$-Y-A$^1$-Y$^2$-(A$^3$-Y$^4$)$_m$-A-Y$^1$— acts as a main chain mesogen, whereas the group >A$^1$-C(Q$^1$)=N—N(A$^x$)A$^y$ acts as a side chain mesogen. The group A$^1$ affects both natures of the main chain mesogen and the side chain mesogen.

Y$^1$ to Y$^8$ are each independently a chemical single bond, —O—, —S—, —O—C(=O)—, —C(=O)—O—, —O—C(=O)—O—, —NR$^1$—C(=O)—, —C(=O)—NR—, —O—C(=O)—NR—, —NR$^1$—C(=O)—O—, —NR$^1$—C(=O)—NR—, —O—NR—, or —NR$^1$—O—.

Herein, R$^1$ is a hydrogen atom or an alkyl group of 1 to 6 carbon atoms.

Examples of the alkyl group of 1 to 6 carbon atoms of R$^1$ may include a methyl group, an ethyl group, a n-propyl group, an isopropyl group, a n-butyl group, a sec-butyl group, a t-butyl group, a n-pentyl group, and a n-hexyl group.

It is preferable that R$^1$ is a hydrogen atom or an alkyl group of 1 to 4 carbon atoms.

In the compound (I), it is preferable that Y$^1$ to Y$^8$ are each independently a chemical single bond, —O—, —O—C(=O)—, —C(=O)—O—, or —O—C(=O)—O—.

In the formula (I) mentioned above, G$^1$ and G$^2$ are each independently a divalent aliphatic group of 1 to 20 carbon atoms optionally having a substituent.

Examples of the divalent aliphatic group of 1 to 20 carbon atoms may include a divalent aliphatic group having a linear structure, such as an alkylene group of 1 to 20 carbon atoms and an alkenylene group of 2 to 20 carbon atoms; and a divalent aliphatic group, such as a cycloalkanediyl group of 3 to 20 carbon atoms, a cycloalkenediyl group of 4 to 20 carbon atoms, and a divalent alicyclic fused ring group of 10 to 30 carbon atoms.

Examples of the substituent in the divalent aliphatic group of $G^1$ and $G^2$ may include a halogen atom, such as a fluorine atom, a chlorine atom, a bromine atom, and an iodine atom; and an alkoxy group of 1 to 6 carbon atoms, such as a methoxy group, an ethoxy group, a n-propoxy group, an isopropoxy group, a n-butoxy group, a sec-butoxy group, a t-butoxy group, a n-pentyloxy group, and a n-hexyloxy group. Among these, a fluorine atom, a methoxy group, and an ethoxy group are preferable.

The aforementioned aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein. However, cases where two or more —O— or —S— are adjacently inserted are excluded. Herein, $R^2$ is a hydrogen atom or an alkyl group of 1 to 6 carbon atoms that are the same as those for $R^1$. It is preferable that $R^2$ is a hydrogen atom or a methyl group.

It is preferable that the group inserted into the aliphatic groups is —O—, —O—C(=O)—, —C(=O)—O—, or —C(=O)—.

Specific examples of the aliphatic groups into which the group is inserted may include —CH$_2$—CH$_2$—O—CH$_2$—CH$_2$—, —CH$_2$—CH$_2$—S—CH$_2$—CH$_2$—, —CH$_2$—CH$_2$—O—C(=O)—CH$_2$—CH$_2$—, —CH$_2$—CH$_2$—C(=O)—O—CH$_2$—CH$_2$—, —CH$_2$—CH$_2$—C(=O)—O—CH$_2$—, —CH$_2$—O—C(=O)—O—CH$_2$—CH$_2$—, —CH$_2$—CH$_2$—NR$^2$—C(=O)—CH$_2$—CH$_2$—, —CH$_2$—CH$_2$—C(=O)—NR$^2$—CH$_2$—, —CH$_2$—NR$^2$—CH$_2$—CH$_2$—, and —CH$_2$—C(=O)—CH$_2$—.

Among these, from the viewpoint of more favorably expressing the desired effect of the present invention, $G^1$ and $G^2$ are each independently preferably a divalent aliphatic group having a linear structure, such as an alkylene group of 1 to 20 carbon atoms and an alkenylene group of 2 to 20 carbon atoms, more preferably an alkylene group of 1 to 12 carbon atoms, such as a methylene group, an ethylene group, a trimethylene group, a propylene group, a tetramethylene group, a pentamethylene group, a hexamethylene group, an octamethylene group, and a decamethylene group [—(CH$_2$)$_{10}$—], and particularly preferably a tetramethylene group [—(CH$_2$)$_4$—], a hexamethylene group [—(CH$_2$)$_6$—], an octamethylene group [—(CH$_2$)$_8$—], or a decamethylene group [—(CH$_2$)$_{10}$—]

In the formula (I) mentioned above, $Z^1$ and $Z^2$ are each independently an alkenyl group of 2 to 10 carbon atoms that may be unsubstituted or substituted by a halogen atom.

It is preferable that the number of carbon atoms in the alkenyl group is 2 to 6. Examples of the halogen atom that is a substituent in the alkenyl group of $Z^1$ and $Z^2$ may include a fluorine atom, a chlorine atom, and a bromine atom. A chlorine atom is preferable.

Specific examples of the alkenyl group of 2 to 10 carbon atoms of $Z^1$ and $Z^2$ may include CH$_2$=CH—, CH$_2$=C(CH$_3$)—, CH$_2$=CH—CH$_2$—, CH$_3$—CH=CH—, CH$_2$=CH—CH$_2$—CH$_2$—, CH$_2$=C(CH$_3$)—CH$_2$—CH$_2$—, (CH$_3$)$_2$C=CH—CH$_2$—, (CH$_3$)$_2$C=CH—CH$_2$—CH$_2$—, CH$_2$=C(Cl)—, CH$_2$=C(CH$_3$)—CH$_2$—, and CH$_3$—CH=CH—CH$_2$—.

Among these, from the viewpoint of favorably expressing the desired effect of the present invention, $Z^1$ and $Z^2$ are each independently preferably CH$_2$=CH—, CH$_2$=C(CH$_3$)—, CH$_2$=C(Cl)—, CH$_2$=CH—CH$_2$—, CH$_2$=C(CH$_3$)—CH$_2$—, or CH$_2$=C(CH$_3$)—CH$_2$—CH$_2$—, more preferably CH$_2$=CH—, CH$_2$=C(CH$_3$)— or CH$_2$=C(Cl)—, and particularly preferably CH$_2$=CH—.

In the formula (I) mentioned above, $A^x$ is an organic group of 2 to 30 carbon atoms having at least one aromatic ring selected from the group consisting of an aromatic hydrocarbon ring and an aromatic heterocyclic ring. The "aromatic ring" means a cyclic structure having aromaticity in the broad sense based on Huckel rule, that is, a cyclic conjugated structure having (4n+2) 7 electrons, and a cyclic structure that exhibits aromaticity by involving a lone pair of electrons of a heteroatom, such as sulfur, oxygen, and nitrogen, in a 7 electron system, typified by thiophene, furan, and benzothiazole.

The organic group of 2 to 30 carbon atoms having at least one aromatic ring selected from the group consisting of an aromatic hydrocarbon ring and an aromatic heterocyclic ring, of $A^x$, may have a plurality of aromatic rings, or have an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring, such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a fused aromatic heterocyclic ring, such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring of $A^x$ may have a substituent. Examples of the substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—R$^5$; —C(=O)—OR; and —SO$_2$R$^6$. Herein, $R^5$ is an alkyl group of 1 to 20 carbon atoms, an alkenyl group of 2 to 20 carbon atoms, or a cycloalkyl group of 3 to 12 carbon atoms. $R^6$ is an alkyl group of 1 to 20 carbon atoms, an alkenyl group of 2 to 20 carbon atoms, a phenyl group, or a 4-methylphenyl group, which are the same as those for $R^4$ which will be described later.

The aromatic ring of $A^x$ may have a plurality of substituents that may be the same or different, and two adjacent substituents may be bonded together to form a ring. The formed ring may be a monocycle or a fused polycycle, and may be an unsaturated ring or a saturated ring.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

Examples of the organic group of 2 to 30 carbon atoms having at least one aromatic ring selected from the group consisting of an aromatic hydrocarbon ring and an aromatic heterocyclic ring, of $A^x$, may include an aromatic hydrocarbon ring group; an aromatic heterocyclic group; an alkyl group of 3 to 30 carbon atoms having at least one aromatic ring selected from the group consisting of an aromatic hydrocarbon ring and an aromatic heterocyclic ring; an alkenyl group of 4 to 30 carbon atoms having at least one aromatic ring selected from the group consisting of an aromatic hydrocarbon ring and an aromatic heterocyclic ring; and an alkynyl group of 4 to 30 carbon atoms having at least one aromatic ring selected from the group consisting of an aromatic hydrocarbon ring and an aromatic heterocyclic ring.

Preferable specific examples of $A^x$ are as follows. However, $A^x$ is not limited to the following examples. In the following formulae, "-" represents an atomic bonding at any position of the ring (the same applies to the following).

(1) An Aromatic Hydrocarbon Ring Group

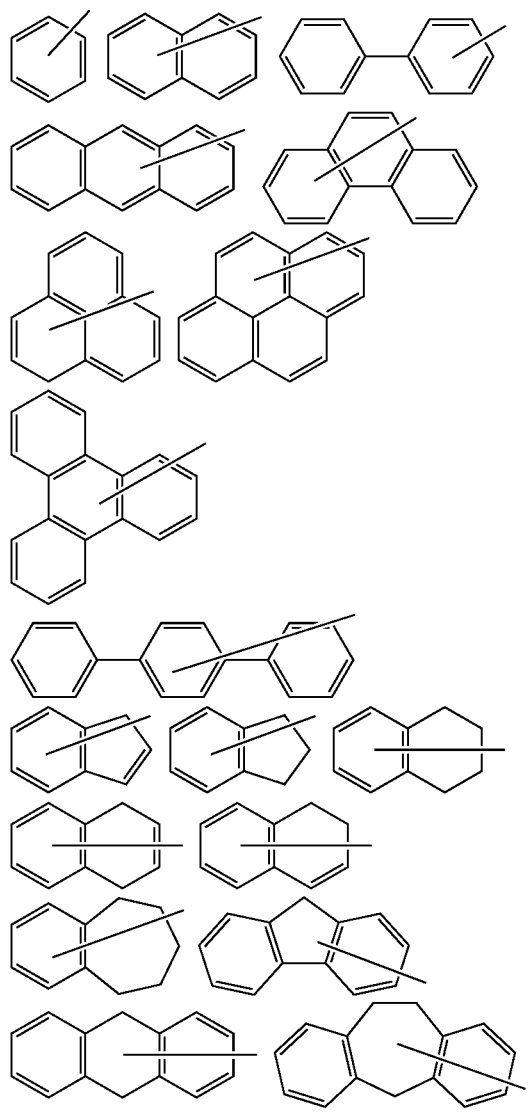

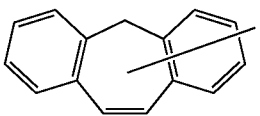

(2) An Aromatic Heterocyclic Group

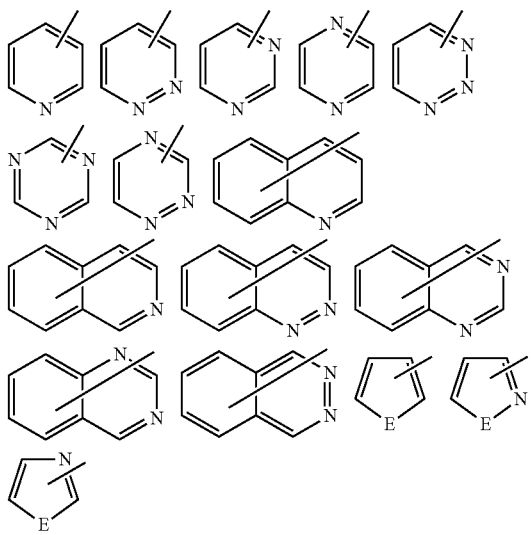

In the aforementioned formulae, E is $NR^{6a}$, an oxygen atom, or a sulfur atom. Herein, $R^{6a}$ is a hydrogen atom; or an alkyl group of 1 to 6 carbon atoms, such as a methyl group, an ethyl group, and a propyl group.

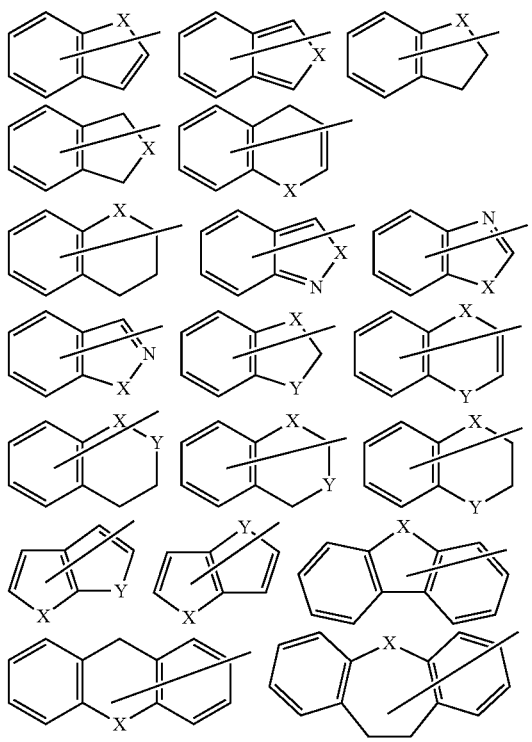

-continued

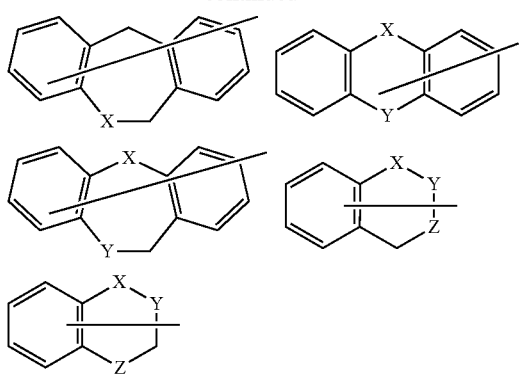

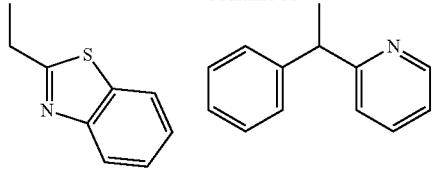

(4) An Alkenyl Group Having at Least One Aromatic Ring Selected from the Group Consisting of an Aromatic Hydrocarbon Ring and an Aromatic Heterocyclic Ring

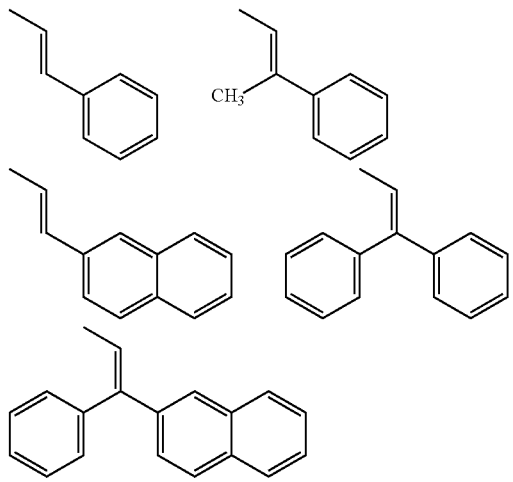

In the aforementioned formulae, X, Y, and Z are each independently $NR^7$, an oxygen atom, a sulfur atom, —SO—, or —$SO_2$— (provided that cases where an oxygen atom, a sulfur atom, —SO—, and —$SO_2$— are each adjacent are excluded). $R^7$ is a hydrogen atom, or an alkyl group of 1 to 6 carbon atoms, such as a methyl group, an ethyl group, and a propyl group, which are the same as those for $R^{6a}$ described above.

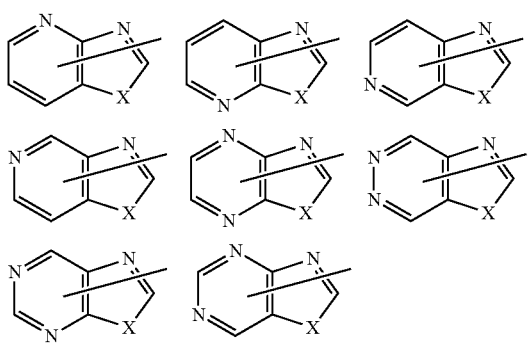

(In the aforementioned formulae, X has the same meanings as described above.)

(3) An Alkyl Group Having at Least One Aromatic Ring Selected from the Group Consisting of an Aromatic Hydrocarbon Ring and an Aromatic Heterocyclic Ring (5) An Alkynyl Group Having at Least One Aromatic Ring Selected from the Group Consisting of an Aromatic Hydrocarbon Ring and an Aromatic Heterocyclic Ring

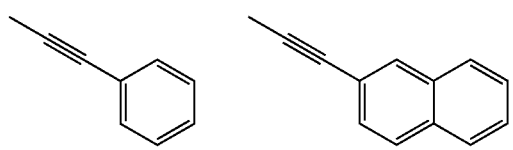

Of $A^x$ described above, an aromatic hydrocarbon ring group of 6 to 30 carbon atoms and an aromatic heterocyclic group of 4 to 30 carbon atoms are preferable, and any of the groups shown below are more preferable.

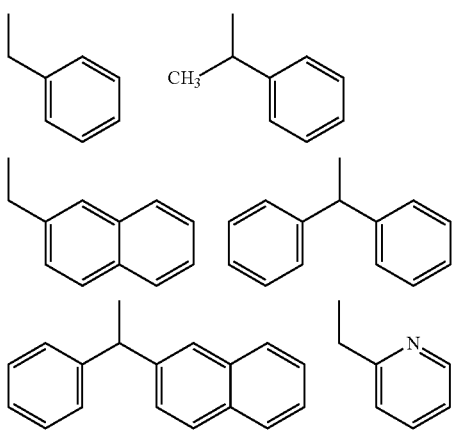

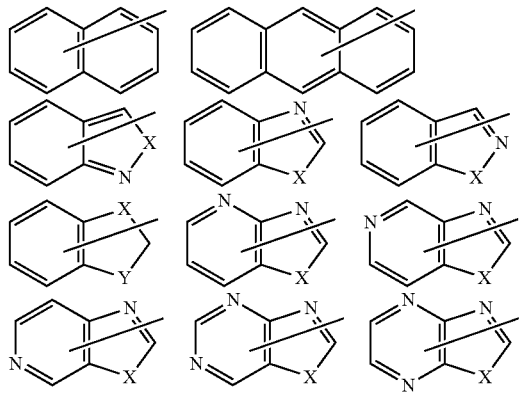

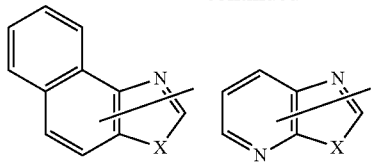

Any of the groups shown below are still more preferable.

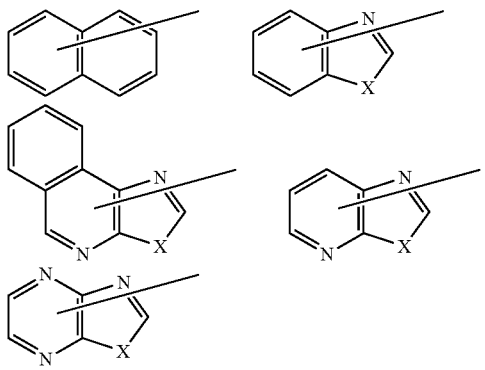

The ring that $A^x$ has may have a substituent. Examples of such a substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—R$^8$; —C(=O)—OR$^8$; and —SO$_2$R$^6$. Herein, R$^8$ is an alkyl group of 1 to 6 carbon atoms, such as a methyl group and an ethyl group; or an aryl group of 6 to 14 carbon atoms, such as a phenyl group. In particular, preferable are a halogen atom, a cyano group, an alkyl group of 1 to 6 carbon atoms, or an alkoxy group of 1 to 6 carbon atoms.

The ring that $A^x$ has may have a plurality of substituents that may be the same or different, and two adjacent substituents may be bonded together to form a ring. The formed ring may be a monocycle or a fused polycycle.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

In the aforementioned formula (I), $A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring. Herein, R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. R$^4$ is an alkyl group of 1 to 20 carbon atoms, an alkenyl group of 2 to 20 carbon atoms, a phenyl group, or a 4-methylphenyl group. R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent.

Examples of the alkyl group of 1 to 20 carbon atoms in the alkyl group of 1 to 20 carbon atoms optionally having a substituent, of $A^y$, may include a methyl group, an ethyl group, a n-propyl group, an isopropyl group, a n-butyl group, an isobutyl group, a 1-methylpentyl group, a 1-ethylpentyl group, a sec-butyl group, a t-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms in the alkyl group of 1 to 20 carbon atoms optionally having a substituent is preferably 1 to 12, and further preferably 4 to 10.

Examples of the alkenyl group of 2 to 20 carbon atoms in the alkenyl group of 2 to 20 carbon atoms optionally having a substituent, of $A^y$, may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icocenyl group. The number of carbon atoms in the alkenyl group of 2 to 20 carbon atoms optionally having a substituent is preferably 2 to 12.

Examples of the cycloalkyl group of 3 to 12 carbon atoms in the cycloalkyl group of 3 to 12 carbon atoms optionally having a substituent, of $A^y$, may include a cyclopropyl group, a cyclobutyl group, a cyclopentyl group, a cyclohexyl group, and a cyclooctyl group.

Examples of the alkynyl group of 2 to 20 carbon atoms in the alkynyl group of 2 to 20 carbon atoms optionally having a substituent, of $A^y$, may include an ethynyl group, a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituents in the alkyl group of 1 to 20 carbon atoms optionally having a substituent and the alkenyl group of 2 to 20 carbon atoms optionally having a substituent, of $A^y$, may include a halogen atom, such as a fluorine atom and a chlorine atom; a cyano group; a substituted amino group, such as a dimethylamino group; an alkoxy group of 1 to 20 carbon atoms, such as a methoxy group, an ethoxy group, an isopropyl group, and a butoxy group; an alkoxy group of 1 to 12 carbon atoms that is substituted by an alkoxy group of 1 to 12 carbon atoms, such as a methoxymethoxy group and a methoxyethoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; a cycloalkyloxy group of 3 to 8 carbon atoms, such as a cyclopentyloxy group, and a cyclohexyloxy group; a cyclic ether group of 2 to 12 carbon atoms, such as a tetrahydrofuranyl group, a tetrahydropyranyl group, a dioxolanyl group, and a dioxanyl group; an aryloxy group of 6 to 14 carbon atoms, such as a phenoxy group, and a naphthoxy group; a fluoroalkoxy group of 1 to 12 carbon atoms in which at least one is substituted by a fluoro atom, such as a trifluoromethyl group, a pentafluoroethyl group, and —$CH_2CF_3$; a benzofuryl group; a benzopyranyl group; a benzodioxolyl group; a benzodioxanyl group; —C(=O)—R; —C(=O)—$OR^{7a}$; —$SO_2R^{8a}$; —$SR^{10}$; an alkoxy group of 1 to 12 carbon atoms substituted by —$SR^{10}$; and a hydroxyl group. Herein, $R^{7a}$ and $R^{10}$ are each independently an alkyl group of 1 to 20 carbon atoms, an alkenyl group of 2 to 20 carbon atoms, a cycloalkyl group of 3 to 12 carbon atoms, or an aromatic hydrocarbon ring group of 6 to 12 carbon atoms. $R^{8a}$ is an alkyl group of 1 to 20 carbon atoms, an alkenyl group of 2 to 20 carbon atoms, a phenyl group, or a 4-methylphenyl group, which are the same as those for $R^4$ described above.

Examples of the substituent in the cycloalkyl group of 3 to 12 carbon atoms optionally having a substituent, of $A^y$, may include a halogen atom, such as a fluorine atom and a chlorine atom; a cyano group; a substituted amino group, such as a dimethylamino group; an alkyl group of 1 to 6 carbon atoms, such as a methyl group, an ethyl group, and a propyl group; an alkoxy group of 1 to 6 carbon atoms, such as a methoxy group, an ethoxy group, and an isopropoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; —C(=O)—$R^{7a}$; —C(=O)—$OR^a$; —$SO_2R^{8a}$; and a hydroxyl group. Herein, $R^{7a}$ and $R^{8a}$ have the same meanings as described above.

Examples of the substituent in the alkynyl group of 2 to 20 carbon atoms optionally having a substituent, of $A^y$, may include substituents that are the same as the substituents in the alkyl group of 1 to 20 carbon atoms optionally having a substituent and the alkenyl group of 2 to 20 carbon atoms optionally having a substituent.

In the group represented by —C(=O)—$R^3$ of $A^y$, $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$; and the aromatic hydrocarbon ring group of 5 to 12 carbon atoms, among the aromatic hydrocarbon ring groups described in $A^x$ described above.

In the group represented by —$SO_2$—$R^4$ of $A^y$, $R^4$ is an alkyl group of 1 to 20 carbon atoms, an alkenyl group of 2 to 20 carbon atoms, a phenyl group, or a 4-methylphenyl group. Specific examples of the alkyl group of 1 to 20 carbon atoms and the alkenyl group of 2 to 20 carbon atoms, of $R^4$, may include those exemplified as the examples of the alkyl group of 1 to 20 carbon atoms, and the alkenyl group of 2 to 20 carbon atoms, of $A^y$ described above.

In the group represented by —C(=S)NH—$R^9$ of $A^y$, $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$ described above; and the aromatic hydrocarbon ring group of 5 to 20 carbon atoms and aromatic heteroaromatic ring group of 5 to 20 carbon atoms, among the aromatic hydrocarbon ring groups and aromatic heteroaromatic ring groups described in $A^x$ described above.

Examples of the organic group of 2 to 30 carbon atoms having at least one aromatic ring selected from the group consisting of an aromatic hydrocarbon ring and an aromatic heterocyclic ring of $A^y$ may include those exemplified as the examples of $A^x$ described above.

Among these, $A^y$ is preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, or an organic group of 2 to 30 carbon atoms having at least one aromatic ring selected from the group consisting of an aromatic hydrocarbon ring and an aromatic heterocyclic ring, and further preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, an aromatic hydrocarbon ring group of 6 to 12 carbon atoms optionally having a substituent, an aromatic heterocyclic group of 3 to 9 carbon atoms optionally having a substituent, —C(=O)—$R^3$, or a group represented by —$SO_2$—$R^4$. Herein, $R^3$ and $R^4$ have the same meanings as described above.

It is preferable that substituents in the alkyl group of 1 to 20 carbon atoms optionally having a substituent, the alkenyl group of 2 to 20 carbon atoms optionally having a substituent, and the alkynyl group of 2 to 20 carbon atoms optionally having a substituent, of $A^y$, are a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a phenylsulfonyl group, a 4-methylphenylsulfonyl group, a benzoyl group, or —$SR^{10}$. Herein, $R^{10}$ has the same meanings as described above.

It is preferable that substituents in the cycloalkyl group of 3 to 12 carbon atoms optionally having a substituent, the aromatic hydrocarbon ring group of 6 to 12 carbon atoms optionally having a substituent, and the aromatic heterocyclic group of 3 to 9 carbon atoms optionally having a substituent, of $A^y$, are a fluorine atom, an alkyl group of 1 to 6 carbon atoms, an alkoxy group of 1 to 6 carbon atoms, or a cyano group.

$A^x$ and $A^y$ may form a ring together. Examples of the ring may include an unsaturated heterocyclic ring of 4 to 30 carbon atoms optionally having a substituent and an unsaturated carbon ring of 6 to 30 carbon atoms optionally having a substituent. The aforementioned unsaturated heterocyclic ring of 4 to 30 carbon atoms and the aforementioned unsaturated carbon ring of 6 to 30 carbon atoms are not particularly restricted, and may or may not have aromaticity.

Examples of the ring formed by $A^x$ and $A^y$ together may include rings shown below. The rings shown below are a moiety of:

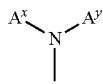

in the formula (I).

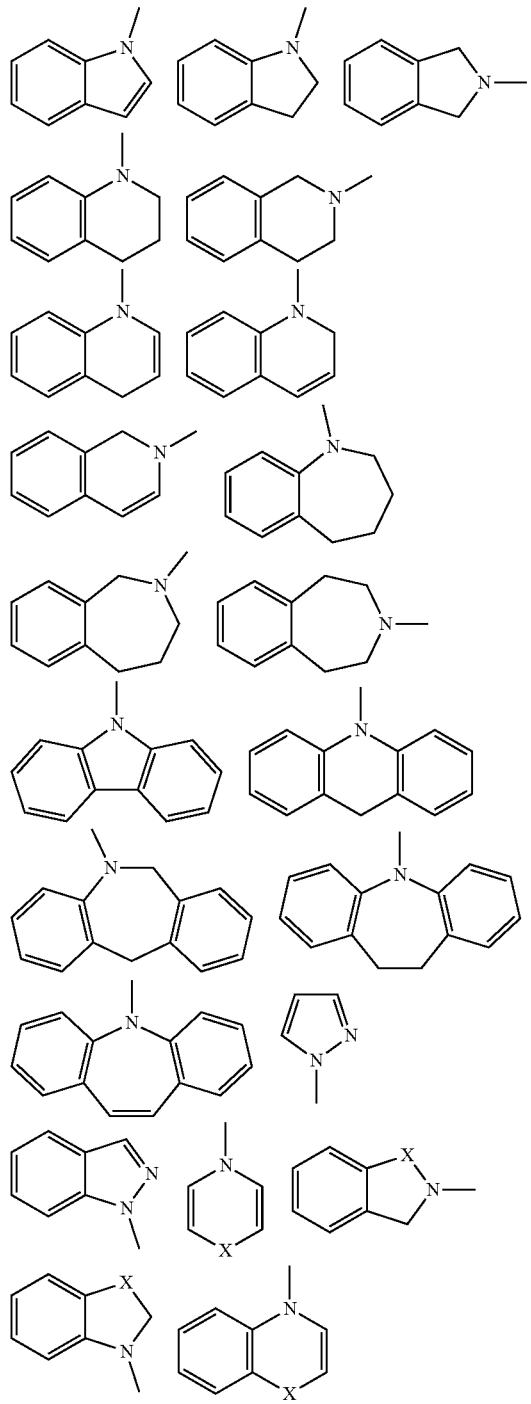

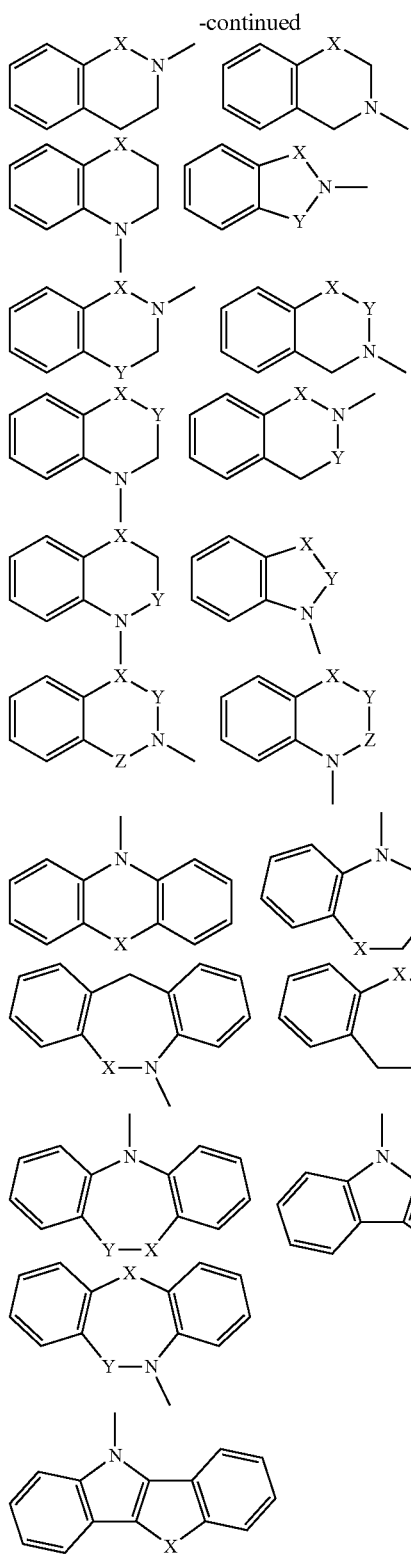

(In the formulae, X, Y, and Z have the same meanings as described above.)

The rings may have a substituent. Examples of the substituent may include those described as the substituent in the aromatic ring of $A^x$.

The total number of π electrons contained in $A^x$ and $A^y$ is preferably 4 or more and 24 or less, more preferably 6 or more and 20 or less, and further preferably 6 or more and 18 or less from the viewpoint of favorably expressing the desired effect of the present invention.

Examples of preferred combination of $A^x$ and $A^y$ may include the following combinations (e) and (3).

(α) a combination of $A^x$ and $A^y$ in which $A^x$ is an aromatic hydrocarbon ring group of 4 to 30 carbon atoms or an aromatic heterocyclic group of 4 to 30 carbon atoms, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —$SR^{10}$.

(β) a combination of $A^x$ and $A^y$ in which $A^x$ and $A^y$ together form an unsaturated heterocyclic ring or an unsaturated carbon ring. Herein, $R^{10}$ has the same meanings as described above.

Examples of more preferred combination of $A^x$ and $A^y$ may include the following combination (γ).

(γ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —$SR^{10}$. Herein, $R^{10}$ has the same meanings as described above.

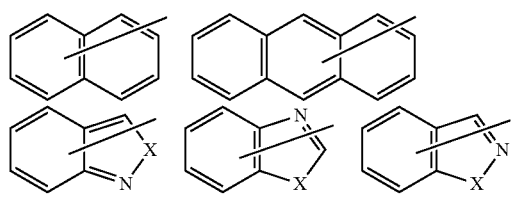

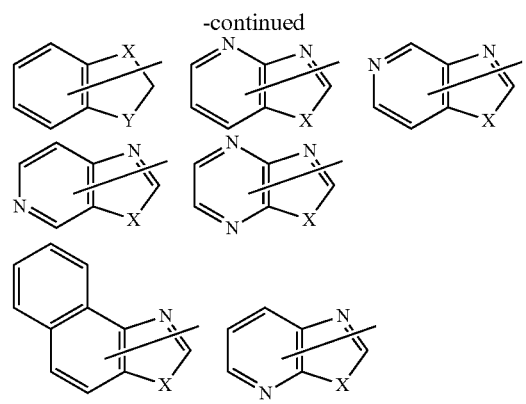

(In the formulae, X and Y have the same meanings as described above.)

Examples of particularly preferred combination of $A^x$ and $A^y$ may include the following combination (δ).

(δ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —$SR^{10}$. In the following formulae, X has the same meanings as described above. Herein, $R^{10}$ has the same meanings as described above.

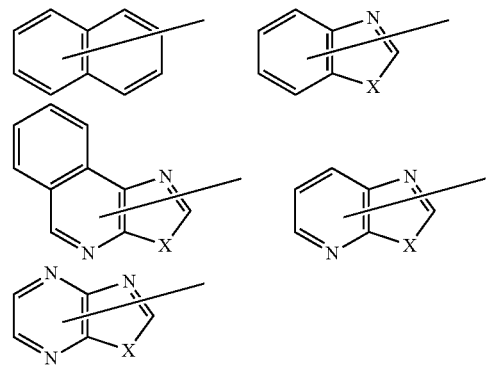

In the formula (I) mentioned above, $A^1$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent aromatic group is preferably the trivalent carbocyclic aromatic group, more preferably a trivalent benzene ring group or a trivalent naphthalene ring group, and further preferably a trivalent benzene ring group or a trivalent naphthalene ring group that is represented by the following formula. In the following formulae, substituents Y and $Y^2$ are described for the sake of convenience to clearly show a bonding state (Y and $Y^2$ have the same meanings as described above, and the same applies to the following).

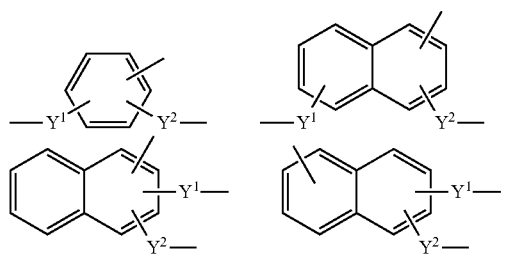

Among these, $A^1$ is more preferably a group represented by each of the following formulae (A11) to (A25), further preferably a group represented by the formula (A11), (A13), (A15), (A19), or (A23), and particularly preferably a group represented by the formula (A11) or (A23).

(A11)

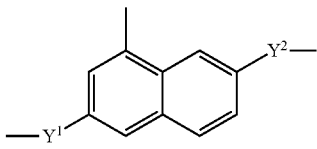

(A12)

(A13)

(A14)

(A15)

(A16)

(A17)

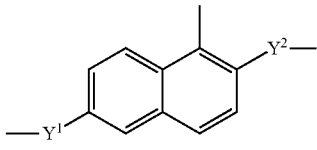

(A18)

(A19)

(A20)

(A21)

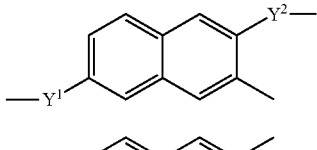

(A22)

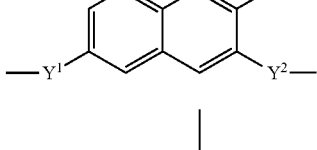

(A23)

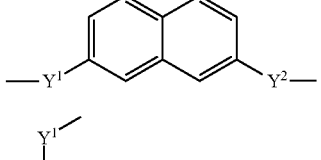

(A24)

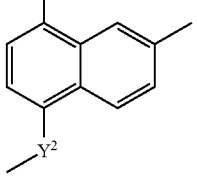

(A25)

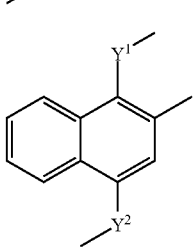

Examples of the substituent that may be included in the trivalent aromatic group of $A^1$ may include those exemplified as the substituent in the aromatic ring of $A^x$ described above. It is preferable that $A^1$ is a trivalent aromatic group having no substituent.

In the formula (I) mentioned above, $A^2$ and $A^3$ are each independently a divalent alicyclic hydrocarbon group of 3 to 30 carbon atoms optionally having a substituent. Examples of the divalent alicyclic hydrocarbon group of 3 to 30 carbon atoms may include a cycloalkanediyl group of 3 to 30 carbon atoms, and a divalent alicyclic fused ring group of 10 to 30 carbon atoms.

Examples of the cycloalkanediyl group of 3 to 30 carbon atoms may include a cyclopropanediyl group; a cyclobutanediyl group, such as a cyclobutane-1,2-diyl group and a cyclobutane-1,3-diyl group; a cyclopentanediyl group, such as a cyclopentane-1,2-diyl group and a cyclopentane-1,3-diyl group; a cyclohexanediyl group, such as a cyclohexane-1,2-diyl group, a cyclohexane-1,3-diyl group, and a cyclohexane-1,4-diyl group; a cycloheptanediyl group, such as a cycloheptane-1,2-diyl group, a cycloheptane-1,3-diyl group, and a cycloheptane-1,4-diyl group; a cyclooctanediyl group, such as a cyclooctane-1,2-diyl group, a cyclooctane-1,3-diyl group, a cyclooctane-1,4-diyl group, and a cyclooctane-1,5-diyl group; a cyclodecanediyl group, such as a cyclodecane-1,2-diyl group, a cyclodecane-1,3-diyl group, a cyclodecane-1,4-diyl group, and a cyclodecane-1,5-diyl group; a cyclododecanediyl group, such as a cyclododecane-1,2-diyl group, a cyclododecane-1,3-diyl group, a cyclododecane-1,4-diyl group, and a cyclododecane-1,5-diyl group; a cyclotetradecanediyl group, such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group, such as a cycloeicosane-1,2-diyl group and a cycloeicosane-1,10-diyl group.

Examples of the divalent alicyclic fused ring group of 10 to 30 carbon atoms may include a decalindiyl group, such as a decalin-2,5-diyl group and a decalin-2,7-diyl group; an adamantanediyl group, such as an adamantane-1,2-diyl group and an adamantane-1,3-diyl group; and a bicyclo[2.2.1]heptanediyl group, such as a bicyclo[2.2.1]heptane-2,3-diyl group, a bicyclo[2.2.1]heptane-2,5-diyl group, and a bicyclo[2.2.1]heptane-2,6-diyl group.

The divalent alicyclic hydrocarbon groups may further have a substituent at any position. Examples of the substituent may include those described as the substituent in the aromatic ring of $A^x$ described above.

Among these, $A^2$ and $A^3$ are preferably a divalent alicyclic hydrocarbon group of 3 to 12 carbon atoms, more preferably a cycloalkanediyl group of 3 to 12 carbon atoms, further preferably a group represented by each of the following formulae (A31) to (A34), and particularly preferably the group represented by the following formula (A32).

(A31)

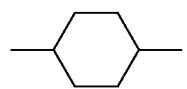

(A32)

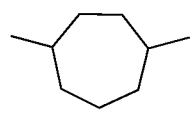

(A33)

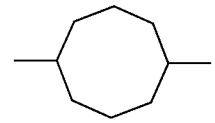

(A34)

The divalent alicyclic hydrocarbon group of 3 to 30 carbon atoms may exist in forms of cis- and trans-stereoisomers that are on the basis of difference of stereoconfiguration of carbon atoms bonded to $Y^1$ and $Y^3$ (or $Y^2$ and $Y^4$). For example, when the group is a cyclohexane-1,4-diyl group, a cis-isomer (A32a) and a trans-isomer (A32b) may exist, as described below.

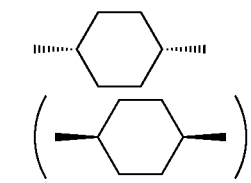

(A32a)

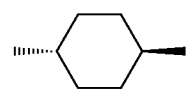

(A32b)

The aforementioned divalent alicyclic hydrocarbon group of 3 to 30 carbon atoms may be a cis-isomer, a trans-isomer, or an isomeric mixture of cis- and trans-isomers. Since the orientation is favorable, the group is preferably the trans-isomer or the cis-isomer, and more preferably the trans-isomer.

In the formula (I) mentioned above, $A^4$ and $A^5$ are each independently a divalent aromatic group of 6 to 30 carbon atoms optionally having a substituent. The aromatic group of $A^4$ and $A^5$ may be monocyclic or polycyclic. Specific preferable examples of $A^4$ and $A^5$ are as follows.

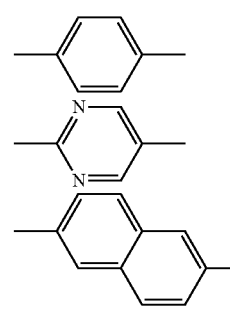

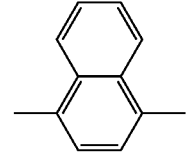

The divalent aromatic groups of $A^4$ and $A^5$ described above may have a substituent at any position. Examples of the substituent may include a halogen atom, a cyano group, a hydroxyl group, an alkyl group of 1 to 6 carbon atoms, an alkoxy group of 1 to 6 carbon atoms, a nitro group, and a —C(=O)—OR$^{8b}$ group. Herein, R$^{8b}$ is an alkyl group of 1 to 6 carbon atoms. In particular, it is preferable that the substituent is a halogen atom, an alkyl group of 1 to 6 carbon atoms, or an alkoxy group. Of the halogen atoms, a fluorine atom is more preferable, of the alkyl groups of 1 to 6 carbon atoms, a methyl group, an ethyl group, and a propyl group are more preferable, and of the alkoxy groups, a methoxy group and an ethoxy group are more preferable.

Among these, from the viewpoint of favorably expressing the desired effect of the present invention, A$^4$ and A$^5$ are each independently preferably a group represented by the following formula (A41), (A42), or (A43) and optionally having a substituent, and particularly preferably the group represented by the formula (A41) and optionally having a substituent.

(A41)

(A42)

(A43)

In the formula (I) mentioned above, Q$^1$ is a hydrogen atom or an alkyl group of 1 to 6 carbon atoms optionally having a substituent. Examples of the alkyl group of 1 to 6 carbon atoms optionally having a substituent may include the alkyl group of 1 to 6 carbon atoms among the alkyl groups of 1 to 20 carbon atoms optionally having a substituent that are exemplified as A$^y$ described above. Among these, Q$^1$ is preferably a hydrogen atom or an alkyl group of 1 to 6 carbon atoms, and more preferably a hydrogen atom or a methyl group.

In the formula (I) mentioned above, m and n are each independently 0 or 1. Among these, m is preferably 1, and n is preferably 1.

The polymerizable liquid crystal compound such as the compound (I) usually has a small refractive index anisotropy Δn. The specific refractive index anisotropy Δn of the polymerizable liquid crystal compound such as the compound (I) is preferably 0.1 or less, more preferably 0.08 or less, and particularly preferably 0.07 or less. When the polymerizable liquid crystal compound such as the compound (I) has a small refractive index anisotropy Δn as previously described, the bandwidth of the selective reflection band of the cholesteric resin layer can be narrowed. There is no particular limitation on the lower limit of the refractive index anisotropy Δn of the polymerizable liquid crystal compound such as the compound (I). The lower limit may be preferably 0.01 or more, more preferably 0.03 or more, and particularly preferably 0.04 or more.

The polymerizable liquid crystal compound such as the compound (I) usually has a high phase transition temperature from liquid crystal phase to isotropic phase. The specific phase transition temperature from liquid crystal phase to isotropic phase of the polymerizable liquid crystal compound such as the compound (I) is preferably 100° C. or higher, more preferably 120° C. or higher, and particularly preferably 150° C. or higher. When the polymerizable liquid crystal compound such as the compound (I) has such a high phase transition temperature from liquid crystal phase to isotropic phase, the polymerizable liquid crystal compound such as the compound (I) can maintain a liquid crystal phase (usually a cholesteric phase) upon polymerization of the polymerizable liquid crystal compound such as the compound (I), and thereby a cholesteric resin layer having a desired circularly polarized light separating function can be achieved. The upper limit of the phase transition temperature from liquid crystal phase to isotropic phase of the polymerizable liquid crystal compound such as the compound (I) may be any temperature, and is preferably 250° C. or less, more preferably 230° C. or less, and particularly preferably 200° C. or less.

The phase transition temperature from crystal phase to liquid crystal phase of the polymerizable liquid crystal compound such as the compound (I) is preferably 50° C. or higher, more preferably 60° C. or higher, and particularly preferably 70° C. or higher, and is preferably 140° C. or lower, more preferably 130° C. or lower, and particularly preferably 120° C. or lower.

The molecular weight of the polymerizable liquid crystal compound such as the compound (I) is preferably 300 or more, more preferably 700 or more, and particularly preferably 1000 or more, and is preferably 2000 or less, more preferably 1700 or less, and particularly preferably 1500 or less. The fact that the polymerizable liquid crystal compound such as the compound (I) has the aforementioned molecular weight represents that the polymerizable liquid crystal compound such as the compound (I) is a monomer. Thereby the liquid crystal composition to be used upon forming the cholesteric resin layer can have particularly favorable coating properties.

The compound (I) may be produced, for example, by the following reaction.

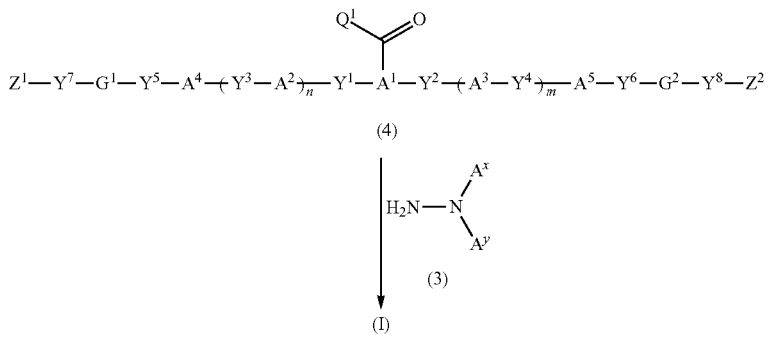

(In the formula, $Y^1$ to $Y^8$, $G^1$, $G^2$, $Z^1$, $Z^2$, $A^x$, $A^y$, $A^1$ to $A^5$, $Q^1$, m, and n have the same meanings as described above.)

As shown in the aforementioned reaction formula, the compound (I) may be produced by a reaction of a hydrazine compound represented by a formula (3) with a carbonyl compound represented by a formula (4).

Hereinafter, the hydrazine compound represented by the formula (3) may be referred to as "hydrazine compound (3)" as appropriate. The carbonyl compound represented by the formula (4) may be referred to as "carbonyl compound (4)" as appropriate.

In the aforementioned reaction, the molar ratio of "the hydrazine compound (3): the carbonyl compound (4)" is preferably 1:2 to 2:1, and more preferably 1:1.5 to 1.5:1. When the compounds are reacted at such a molar ratio, the compound (I) as a target can be highly selectively produced in high yield.

In this case, the reaction system may include an acid catalyst including an organic acid, such as (±)-10-camphorsulfonic acid and p-toluene sulfonic acid; and an inorganic acid, such as hydrochloric acid and sulfuric acid. When the acid catalyst is used, the reaction time may be shortened, and the yield may be improved. The amount of the acid catalyst is usually 0.001 mol to 1 mol relative to 1 mol of the carbonyl compound (4). The acid catalyst as it is may be mixed in the reaction system. Alternatively, the acid catalyst to be mixed may be in a solution form in which the acid catalyst is dissolved in an appropriate solution.

As the solvent for use in the reaction, a solvent inert to the reaction may be used. Examples of the solvent may include an alcohol solvent, such as methyl alcohol, ethyl alcohol, n-propyl alcohol, isopropyl alcohol, n-butyl alcohol, isobutyl alcohol, sec-butyl alcohol, and t-butyl alcohol; an ether solvent, such as diethyl ether, tetrahydrofuran, 1,2-dimethoxyethane, 1,4-dioxane, and cyclopentyl methyl ether; an ester solvent, such as ethyl acetate, propyl acetate, and methyl propionate; an aromatic hydrocarbon solvent, such as benzene, toluene, and xylene; an aliphatic hydrocarbon solvent, such as n-pentane, n-hexane, and n-heptane; an amide solvent, such as N,N-dimethylformamide, N-methylpyrrolidone, and hexamethylphosphoric triamide; a sulfur-containing solvent, such as dimethylsulfoxide, and sulfolane; and a mixed solvent of two or more types thereof. Among these, the alcohol solvent, the ether solvent, and a mixed solvent of the alcohol solvent and the ether solvent are preferable.

The amount of the solvent used is not particularly limited, and may be determined in consideration of type of compound to be used, reaction scale, and the like. The specific amount of the solvent used is usually 1 g to 100 g relative to 1 g of the hydrazine compound (3).

The reaction can smoothly proceed in a temperature range that is usually −10° C. or higher and equal to or lower than the boiling point of the solvent used. The reaction time of each reaction may vary depending on the reaction scale, and is usually several minutes to several hours.

The hydrazine compound (3) may be produced as follows.

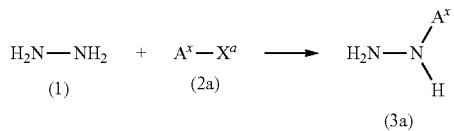

(wherein, $A^x$ and $A^y$ have the same meanings as described above, and $X^a$ is a leaving group, such as a halogen atom, a methanesulfonyloxy group, and a p-toluenesulfonyloxy group.)

As shown in the aforementioned reaction formula, a corresponding hydrazine compound (3a) can be obtained by a reaction of a compound represented by a formula (2a) with hydrazine (1) in an appropriate solvent. In this reaction, the molar ratio of "the compound (2a):the hydrazine (1)" is preferably 1:1 to 1:20, and more preferably 1:2 to 1:10. Further, the hydrazine compound (3a) can be reacted with a compound represented by a formula (2b) to obtain the hydrazine compound (3).

As hydrazine (1), hydrazine monohydrate may be usually used. As hydrazine (1), a commercially available product as it is may be used.

As the solvent for use in this reaction, a solvent inert to the reaction may be used. Examples of the solvent may include an alcohol solvent, such as methyl alcohol, ethyl alcohol, n-propyl alcohol, isopropyl alcohol, n-butyl alcohol, isobutyl alcohol, sec-butyl alcohol, and t-butyl alcohol; an ether solvent, such as diethyl ether, tetrahydrofuran, 1,2-dimethoxyethane, 1,4-dioxane, and cyclopentyl methyl ether; an aromatic hydrocarbon solvent, such as benzene, toluene, and xylene; an aliphatic hydrocarbon solvent, such as n-pentane, n-hexane, and n-heptane; an amide solvent, such as N,N-dimethylformamide, N-methylpyrrolidone, and hexamethylphosphoric triamide; a sulfur-containing solvent, such as dimethylsulfoxide, and sulfolane; and a mixed solvent of two or more types thereof. Among these, the alcohol solvent, the ether solvent, and a mixed solvent of the alcohol solvent and the ether solvent are preferable.

The amount of the solvent used is not particularly limited, and may be determined in consideration of type of compound to be used, reaction scale, and the like. For example, the specific amount of the solvent used is usually 1 g to 100 g relative to 1 g of hydrazine.

The reaction can smoothly proceed in a temperature range that is usually −10° C. or higher and equal to or lower than the boiling point of the solvent used. The reaction time of each reaction may vary depending on the reaction scale, and is usually several minutes to several hours.

The hydrazine compound (3) may also be produced by reducing a diazonium salt (5) through a publicly known method, as described below.

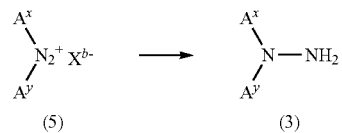

In the formula (5), $A^x$ and $A^y$ have the same meanings as described above, and $X^b$ is an anion that is a counter ion of diazonium. Examples of $X^b$ may include an inorganic anion, such as a hexafluorophosphate ion, a fluoroborate ion, a chloride ion, and a sulfate ion; and an organic anion, such as a polyfluoroalkylcarbonate ion, a polyfluoroalkylsulfonate ion, a tetraphenylborate ion, an aromatic carboxylate ion, and an aromatic sulfonate ion.

Examples of the reducing agent used in the aforementioned reaction may include a metal salt reducing agent. The metal salt reducing agent is generally a compound containing low-valent metal or a compound composed of a metal ion and a hydride source (see "Yuki Gosei Jikkenhou Handbook (Organic synthesis experimental method handbook)", 1990, edited by The Society of Synthetic Organic Chemistry, Japan, published by Maruzen Co., Ltd., p. 810)

Examples of the metal salt reducing agent may include $NaAlH_4$, $NaAlH_p(Or)_q$ (wherein p and q are each independently an integer of 1 to 3, p+q=4, and r is an alkyl group of 1 to 6 carbon atoms), $LiAlH_4$, $iBu_2AlH$, $LiBH_4$, $NaBH_4$, $SnCl_2$, $CrCl_2$, and $TiCl_3$. Herein, "iBu" represents an isobutyl group.

In the reduction reaction, publicly known reaction conditions may be adopted. For example, the reaction may be performed under conditions described in documents including Japanese Patent Application Laid-Open No. 2005-336103 A, Shin Jikken Kagaku Koza (New course of experimental chemistry), 1978, published by Maruzen Co., Ltd., vol. 14, and Jikken Kagaku Koza (Course of experimental chemistry), 1992, published by Maruzen Co., Ltd., vol. 20.

The diazonium salt (5) may be produced from a compound such as aniline by an ordinary method.

The carbonyl compound (4) may be produced, for example, by appropriately bonding and modifying a plurality of publicly known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NH—C(=O)—).

An ether linkage may be formed as follows.

(i) A compound represented by a formula: D1-hal (hal is a halogen atom, and the same applies to the following) and a compound represented by a formula: D2-OMet (Met is an alkaline metal (mainly sodium), and the same applies to the following) are mixed and condensed (Williamson synthesis). In the formulae, D1 and D2 are an optional organic group (the same applies to the following).

(ii) A compound represented by a formula: D1-hal and a compound represented by a formula: D2-OH are mixed in the presence of a base, such as sodium hydroxide and potassium hydroxide and condensed.

(iii) A compound represented by a formula: D1-J (J is an epoxy group) and a compound represented by a formula: D2-OH are mixed in the presence of a base, such as sodium hydroxide and potassium hydroxide and condensed.

(iv) A compound represented by a formula: D1-OFN (OFN is a group having an unsaturated bond) and a compound represented by a formula: D2-OMet are mixed in the presence of a base, such as sodium hydroxide and potassium hydroxide and subjected to an addition reaction.

(v) A compound represented by a formula: D1-hal and a compound represented by a formula: D2-OMet are mixed in the presence of copper or cuprous chloride and condensed (Ullmann condensation).

An ester linkage and an amide linkage may be formed as follows.

(vi) A compound represented by a formula: D1-COOH and a compound represented by a formula: D2-OH or $D2-NH_2$ are subjected to dehydration condensation in the presence of a dehydration condensation agent (N,N-dicyclohexylcarbodiimide, etc.).

(vii) A compound represented by a formula: D1-COOH is reacted with a halogenating agent to obtain a compound represented by a formula: D1-CO-hal, and the compound is reacted with a compound represented by a formula: D2-OH or $D2-NH_2$ in the presence of a base.

(viii) A compound represented by a formula: D1-COOH is reacted with an acid anhydride to obtain a mixed acid anhydride, and the mixed acid anhydride is reacted with a compound represented by a formula: D2-OH or $D2-NH_2$.

(ix) A compound represented by a formula: D1-COOH and a compound represented by a formula: D2-OH or $D2-NH_2$ are subjected to dehydration condensation in the presence of an acid catalyst or a base catalyst.

More specifically, the carbonyl compound (4) may be produced through a process shown in the following reaction formula.

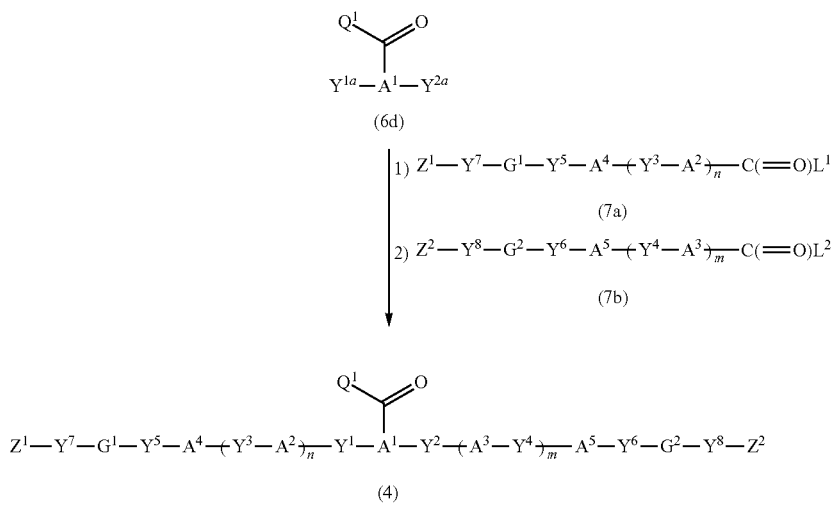

(In the formula, $Y^1$ to $Y^8$, $G^1$, $G^2$, $Z^1$, $Z^2$, $A^1$ to $A^5$, $Q^1$, m, and n have the same meanings as described above; $L^1$ and $L^2$ are each independently a leaving group, such as a hydroxyl group, a halogen atom, a methanesulfonyloxy group, and a p-toluenesulfonyloxy group; —$Y^{1a}$ is a group that is capable of being reacted with -$L^1$ to be —$Y^1$—; and —$Y^2$, is a group that is capable of being reacted with -$L^2$ to be —$Y^2$—).

As shown in the aforementioned reaction formula, the carbonyl compound (4) may be produced by reacting a compound represented by a formula (6d) with a compound represented by a formula (7a) followed by a compound represented by a formula (7b) by using a reaction of forming an ether linkage (—O—), an ester linkage (—C(=O)—O— and —O—C(=O)—), or a carbonate linkage (—O—C(=O)—O—).

Specifically, a method for producing a compound (4') in which $Y^1$ is a group represented by a formula: $Y^{11}$—C(=O)—O— and a group represented by a formula: $Z^2$—$Y^8$-$G^2$-$Y^6$-$A^5$-$(Y^4$-$A^3)_m$-$Y^2$— is the same as a group represented by a formula: $Z^1$—$Y^1$-$G^1$-$Y^5$-$A^4$-$(Y^3$-$A^2)_n$-$Y^1$— is as follows.

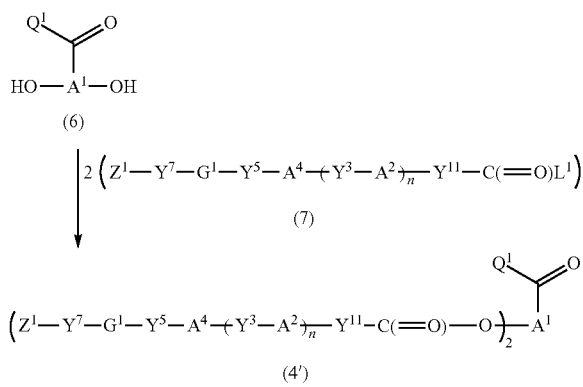

(In the formula, $Y^3$, $Y^5$, $Y^7$, $G^1$, $Z^1$, $A^1$, $A^2$, $A^4$, $Q^1$, n, and $L^1$ have the same meanings as described above; $Y^{11}$ is a group having a structure with which $Y^{11}$—C(=O)—O— corresponds to Y; and Y has the same meanings as described above.)

As shown in the aforementioned reaction formula, the compound (4') may be produced by a reaction of a dihydroxy compound represented by a formula (6) (compound (6)) with a compound represented by a formula (7) (compound (7)). In the aforementioned reaction, the molar ratio of "the compound (6): the compound (7)" is preferably 1:2 to 1:4, and more preferably 1:2 to 1:3. When the compounds are reacted at such a molar ratio, the compound (4') as a target can be highly selectively produced in high yield.

When the compound (7) is a compound in which $L^1$ is a hydroxyl group (carboxylic acid), the reaction may be performed in the presence of a dehydration condensation agent such as 1-ethyl-3-(3-dimethylaminopropyl)carbodiimide hydrochloride and dicyclohexyl carbodiimide, to obtain a target compound. The amount of the dehydration condensation agent used is usually 1 mol to 3 mol relative to 1 mol of the compound (7).

When the compound (7) is a compound in which $L^1$ is a hydroxyl group (carboxylic acid), the reaction may be performed in the presence of sulfonyl halide such as methanesulfonyl chloride and p-toluenesulfonyl chloride, and a base such as triethylamine, diisopropylethylamine, pyridine, and 4-(dimethylamino)pyridine, to obtain a target compound. The amount of the sulfonyl halide used is usually 1 mol to 3 mol relative to 1 mol of the compound (7). The amount of base used is usually 1 mol to 3 mol relative to 1 mol of the compound (7). In this case, a compound in which L in the formula (7) is a sulfonyloxy group (mixed acid anhydride) may be isolated, before performing the subsequent reaction.

When the compound (7) is a compound in which $L^1$ is a halogen atom (acid halide), the reaction may be performed in the presence of a base to obtain a target compound. Examples of the base may include an organic base such as triethylamine and pyridine; and an inorganic base such as sodium hydroxide, sodium carbonate, and sodium hydrogen carbonate. The amount of base used is usually 1 mol to 3 mol relative to 1 mol of the compound (7).

Examples of a solvent for use in the reaction may include a chlorinated solvent, such as chloroform, and methylene chloride; an amide solvent, such as N-methylpyrrolidone, N,N-dimethylformamide, N,N-dimethylacetamide, and hexamethylphosphoric triamide; an ether solvent, such as 1,4-dioxane, cyclopentyl methyl ether, tetrahydrofuran, tetrahydropyran, and 1,3-dioxolane; a sulfur-containing solvent, such as dimethylsulfoxide, and sulfolane; an aromatic hydrocarbon solvent, such as benzene, toluene, and xylene; an aliphatic hydrocarbon solvent, such as n-pentane, n-hexane, and n-octane; an alicyclic hydrocarbon solvent, such as cyclopentane, and cyclohexane; and a mixed solvent of two or more types thereof.

The amount of the solvent used is not particularly limited, and may be determined in consideration of type of compound to be used, reaction scale, and the like. The specific amount of the solvent used is usually 1 g to 50 g relative to 1 g of the hydroxy compound (6).

Most of compounds (6) are publicly known substances, and may be produced by publicly known methods. For example, the compound (6) may be produced by a process shown in the following reaction formula (see International publication WO2009/042544 and The Journal of Organic Chemistry, 2011, 76, 8082-8087). A product commercially available as the compound (6) may be used with, if desired, purification.

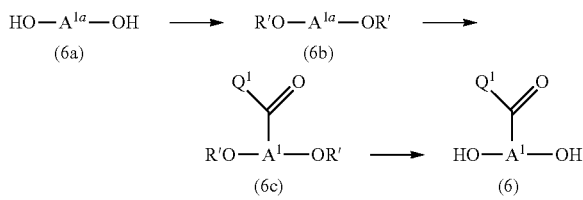

(wherein $A^1$ and $Q^1$ have the same meanings as described above; $A^{1a}$ is a divalent aromatic group that is capable of being formylated or acylated to form $A^1$; and $R^1$ is a protecting group of a hydroxyl group, such as an alkyl group of 1 to 6 carbon atoms such as a methyl group and an ethyl group and an alkoxyalkyl group of 2 to 6 carbon atoms such as a methoxymethyl group.)

As shown in the aforementioned reaction formula, a hydroxyl group of a dihydroxy compound represented by a formula (6a) (1,4-dihydroxybenzene, 1,4-dihydroxynaphthalene, etc.) is alkylated to obtain a compound represented by a formula (6b). Subsequently, an ortho position of an $OR^1$ group is formylated or acylated by a publicly known method, to obtain a compound represented by a formula (6c). The obtained compound may be subjected to deprotection (dealkylation), to produce the compound (6) as a target.

The product commercially available as the compound (6) as it is may be used or with, if desired, purification.

Most of compounds (7) are publicly known compounds, and may be produced, for example, by appropriately bonding and modifying a plurality of publicly known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NH—C(=O)—).

For example, when the compound (7) is a compound represented by the following formula (7') (compound (7')), the compound (7') may be produced as follows, using a dicarboxylic acid represented by a formula (9') (compound (9')).

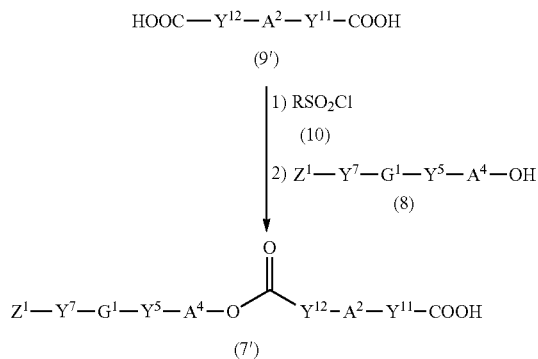

(In the formula, $Y^5$, $Y^7$, $G^1$, $Z^1$, $A^2$, $A^4$, and $Y^{11}$ have the same meanings as described above; $Y^{12}$ is a group having a structure with which —O—C(=O)—$Y^{12}$ corresponds to $Y^3$; and R is an alkyl group, such as a methyl group and an ethyl group, or an aryl group optionally having a substituent, such as a phenyl group and a p-methylphenyl group.)

The compound (9') is first reacted with sulfonyl chloride represented by a formula (10) in the presence of a base such as triethylamine or 4-(dimethylamino)pyridine. Subsequently, to the reaction mixture, a compound (8) and a base such as triethylamine or 4-(dimethylamino)pyridine are added to perform a reaction.

The amount of sulfonyl chloride used is usually 0.5 equivalents to 0.7 equivalents relative to 1 equivalent of the compound (9').

The amount of compound (8) used is usually 0.5 equivalents to 0.6 equivalents relative to 1 equivalent of the compound (9').

The amount of base used is usually 0.5 equivalents to 0.7 equivalents relative to 1 equivalent of the compound (9').

The reaction temperature is 20° C. to 30° C., and the reaction time may vary depending on the reaction scale, and the like, and is several minutes to several hours.

Examples of the solvent for use in the aforementioned reaction may include those exemplified as the examples of the solvent that may be used for producing the compound (4'). Among these, an ether solvent is preferable.

The amount of the solvent used is not particularly limited, and may be determined in consideration of type of compound to be used, reaction scale, and the like. For example, the specific amount of the solvent used is usually 1 g to 50 g relative to 1 g of the hydroxy compound (9').

In any of the reactions, a usual post-treatment operation in organic synthesis chemistry may be performed after completion of the reactions. If desired, a publicly known separation and purification method such as column chromatography, recrystallization, and distillation may be performed to isolate a target compound.

The structure of the target compound may be identified by measurement such as NMR spectrometry, IR spectrometry, and mass spectrometry, and elemental analysis.

<2.2. Polymer>

The cholesteric resin layer is a layer formed of a resin which contains a polymer of the polymerizable liquid crystal compound such as the compound (I). The polymer contained in the cholesteric resin layer may be a copolymer of the polymerizable liquid crystal compound such as the compound (I) and an optional monomer that is polymerizable with the polymerizable liquid crystal compound, but is preferably a polymer of only the polymerizable liquid crystal compound, and particularly preferably a polymer of only the compound (I). The polymer of only the polymerizable liquid crystal compound such as the compound (I) may be a homopolymer of one type of polymerizable liquid crystal compound, or may be a copolymer of two or more types of polymerizable liquid crystal compounds. This polymer may be crosslinked.

The polymer contained in the cholesteric resin layer has cholesteric regularity. Here, the "cholesteric regularity" is a structure in which molecular axes that are aligned in a certain direction on one plane continuously become skewed (twisted) as sequentially passing through the stacked planes, in such a manner that the direction of molecular axes on the subsequently stacked plane is skewed with a small angle, and that on the further subsequent plane is further skewed with a further angle. The structure in which the direction of molecular axes is continuously twisted in this manner is usually a helical structure, and becomes an optically chiral structure. It is preferable that the normal line (helical axis) of the planes is approximately parallel to the thickness direction of the cholesteric resin layer.

The cholesteric resin layer that contains a polymer having cholesteric regularity as previously described usually has a circularly polarized light separating function. Accordingly, when light enters the cholesteric resin layer, only one of counter-clockwise circularly polarized light and clockwise circularly polarized light of the circularly polarized light in a specific wavelength region is reflected, and light other than the reflected circularly polarized light passes through the cholesteric resin layer. This wavelength region in which circularly polarized light is reflected is the selective reflection band.

The specific wavelength in which the cholesteric resin layer containing the polymer of the polymerizable liquid crystal compound exerts a circularly polarized light separating function usually depends on the pitch of the helical structure of the polymer in the cholesteric resin layer. Therefore, the wavelength in which a circularly polarized light separating function is exerted can be controlled by adjusting the size of this pitch of the helical structure.

Further specifically, when the helical axis representing a rotation axis in the twisting of the molecular axes in a helical structure is parallel to the normal line of the cholesteric resin layer, a pitch length p of a helical structure and a wavelength λ of reflected circularly polarized light have a relationship of equation (X) and equation (Y). Here, the pitch length p of a helical structure is a distance in a plane normal line direction, from when the direction of molecular axes starts becoming gradually skewed in a continuous manner as proceeding on planes in a helical structure, to when the direction of molecular axes returns to the original molecular axis direction.

$$\lambda_c = n \times p \times \cos\theta \quad \text{Equation (X):}$$

$$n_o \times p \times \cos\theta \leq \lambda \leq n_e \times p \times \cos\theta \quad \text{Equation (Y):}$$

In the equation (X) and equation (Y), $\lambda_c$ represents a center wavelength of the selective reflection band, $n_o$ represents a refractive index in a minor axis direction of the polymerizable liquid crystal compound, $n_e$ represents a refractive index in a major axis direction of the polymerizable liquid crystal compound, n represents $(n_e+n_o)/2$, p represents a pitch length of a helical structure, and $\theta$ represents an incident angle (an angle formed with the normal line of a plane) of light.

Therefore, the center wavelength $\lambda_c$ of the selective reflection band depends on the pitch length p of the helical structure of the polymer in the cholesteric resin layer. The selective reflection band can be changed by changing this pitch length p of the helical structure. Therefore, it is preferable that the pitch length p of the helical structure of the polymer is set depending on the wavelength of circularly polarized light desired to be reflected on the circularly polarized light separating film. Examples of the method for adjusting the pitch length p may include publicly known methods disclosed in Japanese Patent Application Laid-Open No. 2009-300662. Specific examples may include a method of adjusting the type of a chiral agent or adjusting the amount of a chiral agent.

Furthermore, the bandwidth of the selective reflection band depends on a difference between the refractive index $n_e$ in the major axial direction of the polymerizable liquid crystal compound and the refractive index $n_o$ in the minor axis direction of the polymerizable liquid crystal compound. Therefore, the bandwidth of the selective reflection band depends on the refractive index anisotropy $\Delta n$ of the polymerizable liquid crystal compound. Thus, when the polymerizable liquid crystal compound such as the compound (I) having a small refractive index anisotropy $\Delta n$ is used as the polymerizable liquid crystal compound, the bandwidth of the selective reflection band of the cholesteric resin layer can be narrowed.

<2.3. Optional Component>

The cholesteric resin layer may include an optional component in addition to the aforementioned polymerizable liquid crystal compound such as the compound (I). Such an optional component is preferably a component that does not significantly impair the circularly polarized light separating function of the cholesteric resin layer. For example, the cholesteric resin layer may contain a surfactant which the liquid crystal composition used for forming the cholesteric resin layer may contain. As the optional component, one type thereof may be solely used, and two or more types thereof may also be used in combination at any ratio.

<2.4. Optical Properties of Cholesteric Resin Layer>

As previously described, since the cholesteric resin layer contains a polymer having cholesteric regularity, the cholesteric resin layer has a selective reflection band in which the layer is capable of reflecting circularly polarized light. As the polymerizable liquid crystal compound such as the compound (I) which is a monomer of the polymer contained in the cholesteric resin layer has a small refractive index anisotropy $\Delta n$, the selective reflection band of the cholesteric resin layer is usually narrow. The specific bandwidth of the selective reflection band of the cholesteric resin layer may be set depending on the use of the circularly polarized light separating film. Specifically, the half width of the selective reflection band of the cholesteric resin layer is preferably 50 nm or less, and more preferably 30 nm or less. The lower limit value of the half width of the selective reflection band is not particularly limited, and may be preferably 15 nm or more, more preferably 20 nm or more, and particularly preferably 25 nm or more.

The half width of the selective reflection band of the cholesteric resin layer may be measured by a spectral transmittance meter.

The specific wavelength of the selective reflection band of the cholesteric resin layer may be set depending on the use of the circularly polarized light separating film. For example, the selective reflection band of the cholesteric resin layer may be within the visible range (wavelength: 400 nm or more and 800 nm or less), within the infrared range (wavelength: more than 800 nm), or within the ultraviolet range (wavelength: 1 nm or more and less than 400 nm). In particular, when the selective reflection band of the cholesteric resin layer is within the visible range, the narrow wavelength width of the selective reflection band brings about a clear structural color.

<2.5. Thickness of Cholesteric Resin Layer>

The thickness of one cholesteric resin layer is preferably 0.5 µm or more, more preferably 1.5 µm or more, and particularly preferably 3.0 µm or more, and is preferably 12 µm or less, more preferably 10 µm or less, and particularly preferably 8 µm or less. When the thickness of the cholesteric resin layer is equal to or more than the lower limit value of the aforementioned range, circularly polarized light in the selective reflection band can be effectively reflected. When the thickness is equal to or less than the upper limit value of the aforementioned range, transmittance of the light in a wavelength band other than the selective reflection band can be enhanced.

<2.6. Cholesteric Resin Layer with Concavo-Convex Structure>

The circularly polarized light separating film according to the present invention may have a concavo-convex structure on at least one surface of the resin layer, from the viewpoint of the improvement of reflectivity. The concavo-convex structure can function as a diffraction grating. When circularly polarized light in a specific wavelength band that is reflected on the surface of the resin layer is diffracted, reflectivity of the circularly polarized light increases, and the reflection brightness of the resin layer is improved.

The concavo-convex structure may be a structure in which a plurality of concave portions and convex portions are periodically disposed. Examples of the shape of the concavo-convex structure may include a comb teeth shape, an embossed shape, a corrugated shape, a blazed shape, partial spherical surface shapes, and a combination thereof.

It is preferable that the wavelength band of the circularly polarized light to be reflected by the diffraction of the concavo-convex structure is in line with the wavelength band of the circularly polarized light to be reflected in the cholesteric resin layer, from the viewpoint of further enhancement of the reflectivity of circularly polarized light. Therefore, it is preferable that the concavo-convex structure is provided such that it functions as a diffraction grating with which the wavelength of the diffracted light of the concavo-convex structure can be in the selective reflection band of the cholesteric resin layer.

In the concavo-convex structure, the depth of a concave portion and the distance (pitch) between the center of a concave portion and the center of a concave portion adjacent thereto may be appropriately adjusted depending on the wavelength band of the circularly polarized light to be reflected. The adjustment method may be adjusted by any method such as a known method. For example, when only green circularly polarized light (wavelength: 495 nm to 570 nm) is selectively reflected to obtain a green structural color, the pitch is preferably ((48.54±0.74)/6) m=(8.090±0.123) μm. The depth of a concave portion is preferably 0.03 μm to 10 m, and more preferably 0.1 m to 9 μm.

The depth of a concave portion means a difference in height between the top of a convex portion (the surface of the resin layer) and the deepest part of a concave portion. The pitch represents a distance between the center of a convex portion and the center of a convex portion provided adjacently thereto.

The pitch between a concave portion and a convex portion may be random, but is preferably identical in terms of providing a diffraction function.

[3. Optional Layer]

The circularly polarized light separating film may include an optional layer in combination with the cholesteric resin layer. For example, the circularly polarized light separating film may include a substrate used for forming the cholesteric resin layer. As other examples, the circularly polarized light separating film may also include an adhesive layer, an antifouling layer, a gas barrier layer, a hard coat layer, an anti-glare layer, and an anti-reflective layer.

[4. Method for Producing Circularly Polarized Light Separating Film]

The circularly polarized light separating film may be produced by a production method which includes: a step of forming a layer of the liquid crystal composition containing the polymerizable liquid crystal compound such as the compound (I) on a substrate; and a step of polymerizing the polymerizable liquid crystal compound contained in the layer of the liquid crystal composition. Hereinafter, this production method will be specifically described.

<4.1. Preparation of Substrate>

As a substrate, a film member is usually used. As the material of the substrate, a resin may be used. This resin contains a polymer and, as necessary, an optional component. Examples of the polymer contained in the resin may include a linear olefin polymer, a cycloolefin polymer, polycarbonate, polyester, polysulfone, polyether sulfone, polystyrene, polyvinyl alcohol, a cellulose acetate-based polymer, polyvinyl chloride, and polymethacrylate. As the aforementioned polymer, one type thereof may be solely used, and two or more types thereof may also be used in combination at any ratio. When the substrate is peeled from the cholesteric resin layer after the formation of the cholesteric resin layer, a polymer having low adhesion to the cholesteric resin layer is preferable among the aforementioned polymers. Preferable examples of such a polymer may include a cycloolefin polymer and polyester. A cycloolefin polymer is particularly preferable from the viewpoint of transparency, low hygroscopicity, size stability, and lightweight properties.

The substrate may be a film having a single-layer structure including only one layer, and may also be a film having a multi-layer structure including two or more layers. From the viewpoint of productivity and costs, the substrate for use is preferably a film having a single-layer structure. From the viewpoint of achieving favorable orientation of the polymerizable liquid crystal compound such as the compound (I) during the formation of the cholesteric resin layer, the substrate may be a multi-layer film having an orientation film.

The orientation film may be formed with, for example, a resin containing a polymer such as polyimide, polyvinyl alcohol, polyester, polyarylate, polyamide imide, polyether imide, and polyamide. As the polymer, one type thereof may be solely used, and two or more types thereof may also be used in combination at any ratio. The orientation film may be produced by applying a solution containing the aforementioned polymer, drying the solution, and performing a rubbing treatment to the dried layer. The thickness of the orientation film is preferably 0.01 μm or more, and more preferably 0.05 μm or more, and is preferably 5 μm or less, and more preferably 1 μm or less.

The substrate may be a substrate having been subjected to a surface treatment on one surface or on both surfaces. By performing the surface treatment, adhesion with another layer which is directly formed on the surface of the substrate can be improved. Usually, the surface treatment is performed to the substrate surface on which a layer of the liquid crystal composition is to be formed. Examples of the surface treatment may include an energy ray irradiation treatment and a chemical treatment.

Furthermore, a rubbing treatment may be performed to the substrate surface on which a layer of the liquid crystal composition is to be formed, for promoting the orientation of the polymerizable liquid crystal compound such as the compound (I) during the formation of the cholesteric resin layer.

The thickness of the substrate is preferably 30 μm or more, and more preferably 60 m or more, and is preferably 300 μm or less, and more preferably 200 μm or less, from the viewpoint of handling properties during production, material costs, and reduction in thickness and weight.

<4.2. Step of Forming Layer of Liquid Crystal Composition>

After the preparation of the substrate, there is performed a step of forming, on the substrate, a layer of the liquid crystal composition containing the polymerizable liquid crystal compound such as the compound (I). The liquid crystal composition is a composition which contains at least the polymerizable liquid crystal compound such as the compound (I) and which is usually fluid in the step of forming a layer of the liquid crystal composition on the substrate.

The liquid crystal composition may contain a chiral agent in combination with the polymerizable liquid crystal compound such as the compound (I). The twisting direction of the polymer contained in the cholesteric resin layer may be selected by the type and structure of the chiral agent. Examples of the chiral agent may include those disclosed in Japanese Patent Application Laid-Open No. 2003-66214 A, Japanese Patent Application Laid-Open No. 2003-313187 A, U.S. Pat. No. 6,468,444, International Publication No. 98/00428, and the like. Among these, the chiral agent having a large HTP is preferable from the viewpoint of economy. The HTP is an index representing efficiency of twisting the polymerizable liquid crystal compound. The chiral agent may or may not exhibit liquid crystal properties. Furthermore, from the viewpoint of increasing the crosslinking degree with the polymerizable liquid crystal compound to stabilize the polymer, the chiral agent having a polymerizable group is preferable. As the chiral agent, one type thereof may be solely used, and two or more types thereof may also be used in combination at any ratio.

The amount of the chiral agent, with respect to 100 parts by weight of the polymerizable liquid crystal compound (the compound (I) when the compound (I) is used as the polymerizable liquid crystal compound), is preferably 0.01 parts by weight or more, more preferably 0.1 parts by weight or more, and particularly preferably 0.5 parts by weight or more, and is preferably 35 parts by weight or less, more preferably 25 parts by weight or less, and particularly preferably 15 parts by weight or less. When the amount of the chiral agent falls within the aforementioned range, cholesteric regularity can be expressed in the polymerizable liquid crystal compound such as the compound (I) without lowering crystal liquid properties in the layer of the liquid crystal composition formed on the substrate.

The liquid crystal composition may contain a polymerization initiator in combination with the polymerizable liquid crystal compound such as the compound (I). The polymerization initiator for use may be any of a thermal polymerization initiator and a photopolymerization initiator. The photopolymerization initiator is particularly preferable, because polymerization can be more easily and efficiently performed. Examples of the photopolymerization initiator may include a polynuclear quinone compound (U.S. Pat. Nos. 3,046,127 and 2,951,758), an oxadiazole compound (U.S. Pat. No. 4,212,970), an α-carbonyl compound (U.S. Pat. Nos. 2,367,661 and 2,367,670), acyloin ether (U.S. Pat. No. 2,448,828), an α-hydrocarbon-substituted aromatic acyloin compound (U.S. Pat. No. 2,722,512), a combination of triarylimidazole dimer and p-aminophenylketone (U.S. Pat. No. 3,549,367), and acridine and a phenazine compound (Japanese Patent Application Laid-Open No. SHO. 60-105667 A, U.S. Pat. No. 4,239,850). As the polymerization initiator, one type thereof may be solely used, and two or more types thereof may also be used in combination at any ratio.

The amount of the polymerization initiator, with respect to 100 parts by weight of the polymerizable liquid crystal compound (the compound (I) when the compound (I) is used as the polymerizable liquid crystal compound), is preferably 1 part by weight or more, and is preferably 10 parts by weight or less, and more preferably 5 parts by weight or less.

The liquid crystal composition may contain a surfactant in combination with the polymerizable liquid crystal compound such as the compound (I). By using the surfactant, the surface tension of the layer of the liquid crystal composition can be adjusted. The surfactant is preferably a nonionic surfactant, and is preferably an oligomer having a molecular weight of approximately several thousands. As the surfactant, one type thereof may be solely used, and two or more types thereof may also be used in combination at any ratio.

The amount of the surfactant, with respect to 100 parts by weight of the polymerizable liquid crystal compound (the compound (I) when the compound (I) is used as the polymerizable liquid crystal compound), is preferably 0.01 parts by weight or more, more preferably 0.03 parts by weight or more, and particularly preferably 0.05 parts by weight or more, and is preferably 10 parts by weight or less, more preferably 5 parts by weight or less, and particularly preferably 1 part by weight or less. When the amount of the surfactant falls within the aforementioned range, a cholesteric resin without orientation defects can be formed.

The liquid crystal composition may contain a solvent in combination with the polymerizable liquid crystal compound such as the compound (I). Examples of the solvent may include organic solvents such as a ketone solvent, an alkyl halide solvent, an amide solvent, a sulfoxide solvent, a heterocyclic compound, a hydrocarbon solvent, an ester solvent, and an ether solvent. Among these, a ketone solvent is preferable, when a load on the environment is considered.

As the solvent, one type thereof may be solely used, and two or more types thereof may also be used in combination at any ratio.

The amount of the solvent, with respect to 100 parts by weight of the polymerizable liquid crystal compound (the compound (I) when the compound (I) is used as the polymerizable liquid crystal compound), is preferably 40 parts by weight or more, more preferably 60 parts by weight or more, and particularly preferably 80 parts by weight or more, and is preferably 1000 parts by weight or less, more preferably 800 parts by weight or less, and particularly preferably 600 parts by weight or less. When the amount of the solvent falls within the aforementioned range, occurrence of coating unevenness during the coating with the liquid crystal composition can be suppressed, so that a layer of the liquid crystal composition having a uniform thickness can be formed.

The liquid crystal composition may further contain an optional component as necessary. Examples of the optional component may include: a polymerization inhibitor for improving pot life; a crosslinking agent for increasing the mechanical strength of the cholesteric resin layer; and an antioxidant, an ultraviolet absorber, and photo-stabilizer for enhancing durability. As the optional component, one type thereof may be solely used, and two or more types thereof may also be used in combination at any ratio. The amount of the optional component may be freely determined within the range that does not reduce desired optical performance.

Usually, the layer of the liquid crystal composition is formed by applying the liquid crystal composition onto the substrate. Examples of the coating method may include a spin coating method, a roll coating method, a flow coating method, a printing method, a dip coating method, a flow casting method, a bar coating method, a die coating method, and a gravure printing method.

<4.3. Drying Step>

After the formation of the layer of the liquid crystal composition on the substrate, a step of drying the layer of the liquid crystal composition may be performed as necessary. The drying method may be any method. The temperature condition during drying may be, for example, 40° C. to 150° C.

<4.4. Orientation Step>

After the formation of the layer of the liquid crystal composition on the substrate, a step of performing an orientation treatment may be performed as necessary. The orientation treatment may be performed by, for example, heating at 50° C. to 150° C. for 0.5 minutes to 10 minutes. When the orientation treatment is performed, orientation of the polymerizable liquid crystal compound such as the compound (I) contained in the layer of the liquid crystal composition can be promoted. This allows the polymerizable liquid crystal compound such as the compound (I) to become in the state of a liquid crystal phase having cholesteric regularity.

<4.5. Polymerization Step>

After the formation of the layer of the liquid crystal composition on the substrate, a step of polymerizing the polymerizable liquid crystal compound contained in the layer of the liquid crystal composition is performed. Thereby the polymerizable liquid crystal compound such as the compound (I) polymerizes while maintaining cholesteric regularity. Accordingly, a cholesteric resin layer containing a polymer having cholesteric regularity can be obtained.

The method for polymerizing the polymerizable liquid crystal compound such as the compound (I) may be any method. For example, when a photopolymerization initiator is used as a polymerization initiator, the layer of the liquid crystal composition may be irradiated with light to effect polymerization of the polymerizable liquid crystal compound such as the compound (I). The light for use in this operation may be not only visible light but also ultraviolet light and other electromagnetic waves. Usually, ultraviolet light is used. The irradiation energy of light (integrated light quantity) is preferably 300 mJ/cm$^2$ or more, more preferably 1000 mJ/cm$^2$ or more, and particularly preferably 2000 mJ/cm$^2$ or more, and is preferably 7000 J/cm$^2$ or less, more preferably 6000 J/cm$^2$ or less, and particularly preferably 5000 J/cm$^2$ or less.

When producing the circularly polarized light separating film having a concavo-convex structure on at least one surface of the resin layer, the polymerization step may include a step of semi-curing the layer of the liquid crystal composition, a step of forming a concavo-convex structure on the surface of the semi-cured layer of the liquid crystal composition, and a step of full-curing the semi-cured layer of the liquid crystal composition. A specific example of the method for producing the circularly polarized light separating film including the aforementioned steps will be described below.

<4.5.1. Step of Semi-Curing Layer of Liquid Crystal Composition>

For forming a concavo-convex structure on at least one surface of the resin layer, a step of semi-curing the layer of the liquid crystal composition is performed. The semi-curing step is preferably performed after <4.2. Step of Forming Layer of Liquid Crystal Composition> or after <4.4. Orientation Step>.

The semi-curing means to cause a state in which even when pressed with a pressure of 1 N/m$^2$, adhesiveness is not exhibited.

The polymerization conversion ratio achieved by the polymerization through semi-curing may be preferably 5% to 70% of the polymerization conversion ratio achieved by full-curing. For example, when the polymerization conversion ratio achieved by full-curing is 90%, the polymerization conversion ratio achieved by the polymerization through semi-curing may be 4.5% to 63%.

The method for semi-curing the polymerizable liquid crystal compound may be any method. For example, when a photopolymerization initiator is used as a polymerization initiator, the layer of the liquid crystal composition may be irradiated with light to effect polymerization of the polymerizable liquid crystal compound. The light for use in this operation may be not only visible light but also ultraviolet light and other electromagnetic waves. Usually, ultraviolet light is used.

The irradiation energy of light (integrated light quantity) during the semi-curing step is preferably 1 mJ/cm$^2$ to 1000 mJ/cm$^2$, more preferably 1 mJ/cm$^2$ to 500 mJ/cm$^2$, further preferably 1 mJ/cm$^2$ to 200 mJ/cm$^2$, and still further preferably 10 mJ/cm$^2$ to 200 mJ/cm$^2$.

Irradiation with ultraviolet light may be performed from the side on which the polymerizable liquid crystal composition is applied (the side of the layer of the liquid crystal composition), or from the substrate side.

<4.5.2. Step of Forming Concavo-Convex Structure on Surface of Semi-Cured Layer of Liquid Crystal Composition>

After the layer of the liquid crystal composition was semi-cured, a step of forming a concavo-convex structure on the surface of the semi-cured layer of the liquid crystal composition is performed. In this step, a mold such as a metal mold having a desired concavo-convex shape is prepared, and the concavo-convex structure of the prepared mold is transferred onto the surface of the semi-cured layer of the liquid crystal composition. The semi-cured layer of the liquid crystal composition is softer than the layer whose polymerization conversion ratio of the polymerizable liquid crystal compound comes to be 100%. Therefore, transfer of the concavo-convex structure onto the semi-cured layer with the mold is easily performed.

The mold may be produced by a known method or the like. The material of the mold is not particularly limited, and any known material may be used. A specific example of the mold may be an emboss roll.

The pressure for transferring the concavo-convex structure to the semi-cured layer of the liquid crystal composition with the mold is preferably 0.5 MPa to 50 MPa, and more preferably 1 MPa to 30 MPa.

For more efficiently transferring the concavo-convex structure, it is preferable that the transfer is performed with the mold while heating the semi-cured layer of the liquid crystal composition. The transfer temperature is preferably 50° C. to 200° C., and more preferably 70° C. to 110° C. When the transfer temperature is confined to the aforementioned range, the phase transition from a liquid crystal phase to an isotropic phase of the polymerizable liquid crystal compound can be suppressed.

When forming the concavo-convex structure on the surface of the semi-cured layer of the liquid crystal composition with an emboss roll, the layer of the liquid crystal composition is usually moved while transferring the concavo-convex structure onto the layer of the liquid crystal composition with an emboss roll.

The moving speed of the layer of the liquid crystal composition is preferably 1 m/min to 50 m/min, and more preferably 3 m/min to 20 m/min.

<4.5.3. Step of Full-Curing Layer of Liquid Crystal Composition>

After the formation of the concavo-convex structure on the semi-cured layer of the liquid crystal composition, a step of full-curing the semi-cured layer of the liquid crystal composition is performed. Thereby the polymerizable liquid crystal compound such as the compound (I) polymerizes while maintaining cholesteric regularity. Accordingly, a cholesteric resin layer which contains a polymer having cholesteric regularity and has a concavo-convex structure on the surface can be obtained.

The full-curing means to cause a state in which even when heated at 130° C. for 10 minutes after curing, the shape does not change. That the shape does not change means that the change ratios of the pitch and depth of the concave and convex portions before and after the heating at 130° C. for 10 minutes are within 5%.

Similarly to the semi-curing step, full-curing is usually performed by irradiation with ultraviolet light. The irradiation energy of ultraviolet light and a preferable range of the irradiation energy are as described in <4.5. Polymerization Step>. The illuminance of ultraviolet light during the step of full-curing the semi-cured layer of the liquid crystal composition is preferably more than 500 mW/cm$^2$ and 5000 mW/cm$^2$ or less, and more preferably 1000 mW/cm$^2$ or more and 3000 mW/cm$^2$ or less.

In the present invention, the step of forming a concavo-convex structure on the semi-cured layer of the liquid crystal composition and the step of full-curing the layer of the liquid crystal composition may be simultaneously performed. In this case, the full-curing is performed by irradiating the layer with ultraviolet light simultaneously with transfer of the concavo-convex structure with a mold.

A substrate film for transfer may be bonded to the layer of the liquid crystal composition via an adhesive layer, before performing the step of semi-curing the layer of the liquid crystal composition, the step of forming a concavo-convex structure on the surface of the semi-cured layer of the liquid crystal composition, and the step of full-curing the layer of the liquid crystal composition. As the details of this method, the descriptions in paragraphs 0071 to 0092 of Japanese Patent Application Laid-Open No. 2014-174321 A may be referred to, the content of which is incorporated herein by reference.

<4.6. Optional Step>

The method for producing the circularly polarized light separating film may further include an optional step in addition to the aforementioned steps. For example, the method for producing the circularly polarized light separating film may include a step of peeling the substrate from the cholesteric resin layer, a step of bonding an optional film to the cholesteric resin layer, and a step of further disposing an optional layer.

[5. Use of Circularly Polarized Light Separating Film]

Use of the circularly polarized light separating film is not particularly limited. The circularly polarized light separating film may be used as a decorating film, a laser beam reflecting film, and a sunglass blackout preventing film.

Since a concavo-convex structure has a diffraction function, the circularly polarized light separating film having the concavo-convex structure on at least one surface of the resin layer can increase the reflectivity of circularly polarized light having a certain color thereby to improve the reflection brightness of a desired structural color. Therefore, such a circularly polarized light separating film may be used as a decorating film and the like.

EXAMPLES

Hereinafter, the present invention will be specifically described with reference to Examples. However, the present invention is not limited to the following Examples. The present invention may be freely modified for implementation without departing from the scope of claims of the present invention and the scope of their equivalents. Unless otherwise specified, "%" and "part(s)" that represent an amount in the following description are on the basis of weight. Unless otherwise specified, the following operations were performed under conditions of normal temperature and normal pressure in the atmospheric air.

Example 1

A liquid crystal composition was obtained by mixing 1 part of a polymerizable liquid crystal compound represented by the following formula (A) (refractive index anisotropy Δn=0.07, phase transition temperature from liquid crystal phase to isotropic phase: 200° C. or higher, phase transition temperature from crystal phase to liquid crystal phase: 102° C.), 0.13 parts of a chiral agent ("LC756" manufactured by BASF Co., Ltd.), 0.035 parts of a photopolymerization initiator ("Irgacure 379" manufactured by BASF Co., Ltd.), 0.0013 parts of a surfactant ("s242" manufactured by AGC Seimi Chemical Co., Ltd.), and 1.5 parts of cyclopentanone as a solvent.

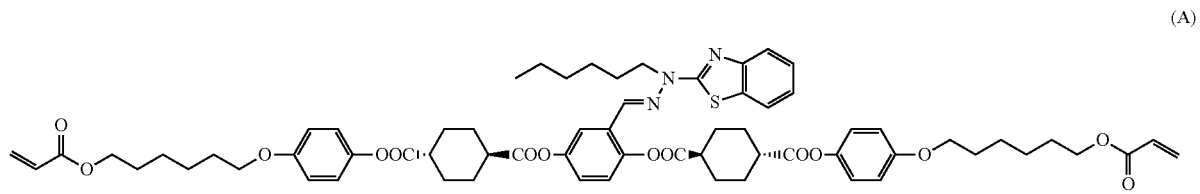

(A)

As a substrate film, there was prepared a polyethylene terephthalate film (thickness: 100 m) having been subjected to an adhesion facilitating treatment on one surface. A rubbing treatment was performed to this substrate film on the surface which had not been subjected to the adhesion facilitating treatment. Subsequently, the aforementioned liquid crystal composition was applied onto the surface having been subjected to a rubbing treatment. Consequently, a layer of the liquid crystal composition in an uncured state was formed on one surface of the substrate film.

Thereafter, drying was performed at 80° C. for 1 minute to remove the solvent from the layer of the liquid crystal composition. Furthermore, an orientation treatment was performed at 130° C. for 2 minutes to orient the polymerizable liquid crystal compound. Subsequently, the layer of the liquid crystal composition was irradiated with ultraviolet light at 2000 mJ/cm$^2$. By the irradiation with ultraviolet light, polymerization of the polymerizable liquid crystal compound proceeded to form a cholesteric resin layer (thickness: 5 μm) on one surface of the substrate film. Consequently, there was obtained a circularly polarized light separating film including a substrate film and a cholesteric resin layer.

The half width of the selective reflection band of the produced circularly polarized light separating film was measured using a spectral transmittance meter ("V-550" manufactured by JASCO Corporation). The result was 30 nm.

As understood from the aforementioned result, according to the present invention, there can be achieved a circularly polarized light separating film which can selectively reflect circularly polarized light in a narrow wavelength band.

Example 2

There were prepared a substrate film having been subjected to the rubbing treatment that is the same as that of Example 1, and a liquid crystal composition that is the same as that of Example 1. The liquid crystal composition was applied onto the surface having been subjected to the rubbing treatment of the substrate film. Consequently, a layer of the liquid crystal composition in an uncured state was formed on one surface of the substrate film.

Thereafter, drying was performed at 80° C. for 1 minute to remove the solvent from the layer of the liquid crystal composition. Furthermore, an orientation treatment was performed at 130° C. for 2 minutes to orient the polymerizable liquid crystal compound.

Subsequently, the layer of the liquid crystal composition was irradiated with ultraviolet light at an illuminance of 100 mW/cm$^2$ and an integrated light amount of 100 mJ/cm$^2$ to obtain the layer of the liquid crystal composition in a semi-cured state.

In order to achieve selective reflection of green circularly polarized light, there was prepared an emboss roll which includes a concavo-convex structure (diffraction grating pattern) having an emboss shape with a depth of 1.1 μm and a pitch of 8.1 μm. The layer of the liquid crystal composition in a semi-cured state was pressed at a pressure of 5 MPa with the emboss roll at a temperature of 100° C. while the layer of the liquid crystal composition in a semi-cured state was moved at a rate of 10 m/min. Consequently, the concavo-convex structure was transferred to the layer of the liquid crystal composition in a semi-cured state.

After the concavo-convex structure was formed on the surface of the semi-cured layer of the liquid crystal composition, the layer of the liquid crystal composition was irradiated with ultraviolet light at an illuminance of 1000 mW/cm$^2$ and an integrated light amount of 2000 mJ/cm$^2$ under a nitrogen atmosphere. By the irradiation with ultraviolet light, polymerization of the polymerizable liquid crystal compound proceeded to form, on one surface of the substrate film, a cholesteric resin layer (thickness: 5 μm) having the concavo-convex structure of an emboss shape with a depth of 1.1 μm and a pitch of 8.1 μm. Consequently, there was obtained a circularly polarized light separating film including a substrate film and a cholesteric resin layer having a concavo-convex structure on its surface.

The half width of the selective reflection band of the produced circularly polarized light separating film having the concavo-convex structure was measured using a spectral transmittance meter ("V-550" manufactured by JASCO Corporation). The result was 26 nm.

It was confirmed that the concavo-convex structure functioned as a diffraction grating, and the reflection brightness of the resin layer was higher than that of the circularly polarized light separating film without the concavo-convex structure.

Comparative Example 1

The type of the polymerizable liquid crystal compound was changed from the polymerizable liquid crystal compound represented by the aforementioned formula (A) to another polymerizable liquid crystal compound ("Paliocolor LC-242" manufactured by BASF Co., Ltd.; refractive index anisotropy Δn=0.14, phase transition temperature from liquid crystal phase to isotropic phase: 118° C., phase transition temperature from crystal phase to liquid crystal phase: 65° C.). Also, the integrated light amount of the ultraviolet light used for irradiating the layer of the liquid crystal composition was changed to 50 mJ/cm$^2$. Other than these matters, a circularly polarized light separating film was produced and evaluated in the same manner as that in Example 1.

As a result of the evaluation, the half width of the selective reflection band of the circularly polarized light separating film was 61 nm.

It is noted that the present inventor attempted to produce a circularly polarized light separating film as Reference Experiment 1 in the same manner as that in Example 1, except that the type of the polymerizable liquid crystal compound was changed from the polymerizable liquid crystal compound represented by the aforementioned formula (A) to the polymerizable liquid crystal compound ("Paliocolor LC-242" manufactured by BASF Co., Ltd.) used in Comparative Example 1. However, when the integrated light amount of ultraviolet light was increased in an attempt to completely cure the layer of the liquid crystal composition, the heat of ultraviolet light caused phase transition of the layer of the liquid crystal composition to an isotropic phase. As a result, a circularly polarized light separating film was not obtained. Therefore, in Comparative Example 1 mentioned above, the integrated light amount of the ultraviolet light used for irradiating the layer of the liquid crystal composition was adjusted to 50 mJ/cm$^2$.

Comparative Example 2

The type of the polymerizable liquid crystal compound was changed from the polymerizable liquid crystal compound represented by the aforementioned formula (A) to another polymerizable liquid crystal compound ("UCL-017A" manufactured by DIC Corporation; refractive index anisotropy Δn=0.16, phase transition temperature from crystal phase to liquid crystal phase: 96° C.). Also, the integrated light amount of the ultraviolet light used for irradiating the layer of the liquid crystal composition was changed to 50 mJ/cm$^2$. Other than these matters, a circularly polarized light separating film was produced and evaluated in the same manner as that in Example 1.

As a result of the evaluation, the half width of the selective reflection band of the circularly polarized light separating film was 70 nm.

It is noted that the present inventor attempted to produce a circularly polarized light separating film as Reference Experiment 2 in the same manner as that in Example 1, except that the type of the polymerizable liquid crystal compound was changed from the polymerizable liquid crystal compound represented by the aforementioned formula (A) to the polymerizable liquid crystal compound ("UCL-017A" manufactured by DIC Corporation) used in Comparative Example 2. However, when the integrated light amount of ultraviolet light was increased in an attempt to completely cure the layer of the liquid crystal composition, the heat of ultraviolet light caused phase transition of the layer of the liquid crystal composition to an isotropic phase. As a result, a circularly polarized light separating film was not obtained. Therefore, in Comparative Example 2 mentioned above, the integrated light amount of the ultraviolet light used for irradiating the layer of the liquid crystal composition was adjusted to 50 mJ/cm$^2$.

Example 3

A circularly polarized light separating film (R) was produced in the same manner as that in Example 1, except that the amount of the chiral agent was changed to 0.11 parts. The center wavelength of the selective reflection band of this circularly polarized light separating film (R) was approximately 460 nm, and the circularly polarized light separating film (R) selectively reflected red light.

Also, a circularly polarized light separating film (G) was produced in the same manner as that in Example 1. The center wavelength of the selective reflection band of this circularly polarized light separating film (G) was approximately 560 nm, and the circularly polarized light separating film (G) selectively reflected green light.

A circularly polarized light separating film (B) was produced in the same manner as that in Example 1, except that the amount of the chiral agent was changed to 0.15 parts. The center wavelength of the selective reflection band of this circularly polarized light separating film (B) was approximately 620 nm, and the circularly polarized light separating film (B) selectively reflected blue light.

The circularly polarized light separating film (R), the circularly polarized light separating film (G), and the circularly polarized light separating film (B) were bonded together to obtain a sample film. In a wavelength range of 380 nm to 780 nm, the spectral transmittance of the aforementioned sample film was measured using a spectral transmittance meter ("V-550" manufactured by JASCO Corporation). The transmittance of each wavelength in the spectral transmittance measured here indicates the ratio of the transmitted light intensity relative to a total of the transmitted light intensity and the reflected light intensity.

A graph of the spectral transmittance of the sample film is schematically illustrated in FIG. 1. From the measured spectral transmittance, the ratio of $\lambda 1$, $\lambda 2$, $\lambda 3$ and $\lambda 4$ which have a transmittance of 90% or more in the wavelength range of 380 nm to 780 nm as illustrated in FIG. 1 was calculated as a transmission wavelength ratio. Specifically, the transmission wavelength ratio was calculated in accordance with the following equation:

Transmission wavelength ratio (%)={($\lambda 1+\lambda 2+\lambda 3+\lambda 4$)/(400 nm)}×100.

As a result of the calculation, the transmission wavelength ratio was 62.5%. Larger transmission wavelength ratio is indicative of the narrower wavelength width of the selective reflection band for the circularly polarized light separating film (R), the circularly polarized light separating film (G), and the circularly polarized light separating film (B). In Example 3, a large transmission wavelength ratio was obtained as previously described. Therefore, the wavelength width of the selective reflection band for the circularly polarized light separating film (R), the circularly polarized light separating film (G), and the circularly polarized light separating film (B) may be evaluated to be sufficiently narrow.

Comparative Example 3

A circularly polarized light separating film (R) was produced in the same manner as that in Comparative Example 1, except that the amount of the chiral agent was changed to 0.11 parts. The circularly polarized light separating film (R) selectively reflected red light.

Also, a circularly polarized light separating film (G) was produced in the same manner as that in Comparative Example 1. This circularly polarized light separating film (G) selectively reflected green light.

Furthermore, a circularly polarized light separating film (B) was produced in the same manner as that in Comparative Example 1, except that the amount of the chiral agent was changed to 0.15 parts. This circularly polarized light separating film (B) selectively reflected blue light.

The circularly polarized light separating film (R), the circularly polarized light separating film (G), and the circularly polarized light separating film (B) were bonded together to obtain a sample film. The transmission wavelength ratio of this sample film was measured in the same manner as that in Example 3. As a result of the measurement, the transmission wavelength ratio was 31.8%.

Comparative Example 4

A circularly polarized light separating film (R) was produced in the same manner as that in Comparative Example 2, except that the amount of the chiral agent was changed to 0.11 parts. This circularly polarized light separating film (R) selectively reflected red light.

Also, a circularly polarized light separating film (G) was produced in the same manner as that in Comparative Example 2. This circularly polarized light separating film (G) selectively reflected green light.

Furthermore, a circularly polarized light separating film (B) was produced in the same manner as that in Comparative Example 2, except that the amount of the chiral agent was changed to 0.15 parts. This circularly polarized light separating film (B) selectively reflected blue light.

The circularly polarized light separating film (R), the circularly polarized light separating film (G), and the circularly polarized light separating film (B) were bonded together to obtain a sample film. The transmission wavelength ratio of this sample film was measured in the same manner as that in Example 3. As a result of the measurement, the transmission wavelength ratio was 17.5%.

The invention claimed is:

1. A circularly polarized light separating film comprising a resin layer containing a polymer of a polymerizable liquid crystal compound, wherein
   the polymerizable liquid crystal compound contains a main-chain mesogen and a side-chain mesogen bonded to the main-chain mesogen in a molecule of the polymerizable liquid crystal compound,
   the polymer has cholesteric regularity,
   the resin layer has a wavelength band in which the layer is capable of reflecting circularly polarized light,
   at least one surface of the resin layer has a concavo-convex structure, and
   the concavo-convex structure functions as a diffraction grating that reflects light having a wavelength in the wavelength band.

2. The circularly polarized light separating film according to claim 1, wherein the side-chain mesogen of the polymerizable liquid crystal compound contains an element having a high refractive index.

3. The circularly polarized light separating film according to claim 1, wherein the side-chain mesogen of the polymerizable liquid crystal compound contains a benzothiazole ring.

4. The circularly polarized light separating film according to claim 1, wherein the polymerizable liquid crystal compound is represented by the following Formula (I):

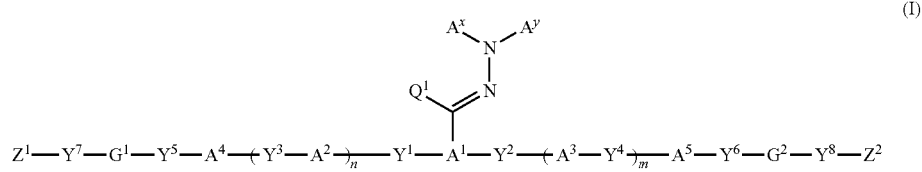

wherein
$Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;

G$^1$ and G$^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; provided that a case where two or more —O— or —S— groups are adjacently inserted are excluded, wherein R$^2$ is a hydrogen atom or an alkyl group of 1 to 6 carbon atoms;

Z$^1$ and Z$^2$ are each independently an alkenyl group of 2 to 10 carbon atoms optionally being substituted by a halogen atom;

A$^x$ is an organic group of 2 to 30 carbon atoms having at least one aromatic ring selected from the group consisting of an aromatic hydrocarbon ring and an aromatic heterocyclic ring;

A$^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring, wherein R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; R$^4$ is an alkyl group of 1 to 20 carbon atoms, an alkenyl group of 2 to 20 carbon atoms, a phenyl group, or a 4-methylphenyl group; R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that A$^x$ and A$^y$ have may have a substituent; and A$^x$ and A$^y$ may form a ring together;

A$^1$ is a trivalent aromatic group optionally having a substituent;

A$^2$ and A$^3$ are each independently a divalent alicyclic hydrocarbon group of 3 to 30 carbon atoms optionally having a substituent;

A$^4$ and A$^5$ are each independently a divalent aromatic group of 6 to 30 carbon atoms optionally having a substituent;

Q$^1$ is a hydrogen atom or an alkyl group of 1 to 6 carbon atoms optionally having a substituent; and m and n are each independently 0 or 1.

5. The circularly polarized light separating film according to claim 1, wherein
a half width of the wavelength band is 50 nm or less.

6. The circularly polarized light separating film according to claim 1, wherein a refractive index anisotropy Δn of the polymerizable liquid crystal compound is 0.01 or more and 0.1 or less.

7. The circularly polarized light separating film according to claim 1, wherein a phase transition temperature from a liquid crystal phase to an isotropic phase of the polymerizable liquid crystal compound is 100° C. or higher.

8. The circularly polarized light separating film according to claim 1, wherein the circularly polarized light separating film is a decorating film.

9. A method for producing the circularly polarized light separating film according to claim 1, the method comprising:
a step of forming a layer of a liquid crystal composition containing the polymerizable liquid crystal compound, and
a step of polymerizing the polymerizable liquid crystal compound contained in the layer of the liquid crystal composition,
wherein the step of polymerizing the polymerizable liquid crystal compound includes:
a step of semi-curing the layer of the liquid crystal composition;
a step of forming the concavo-convex structure on a surface of the semi-cured layer of the liquid crystal composition, and
a step of full-curing the layer of the liquid crystal composition.

* * * * *